US 011518631 B2

United States Patent
Ruhland et al.

(10) Patent No.: US 11,518,631 B2
(45) Date of Patent: Dec. 6, 2022

(54) DELIVERY SYSTEM

(71) Applicant: BHS Intralogistics GmbH, Mintraching (DE)

(72) Inventors: Karl Ruhland, Pfreimd (DE); Martin Ruhland, Regensburg—Sallern-Gallingkofen (DE); Klaus Plschek, Wörth (DE)

(73) Assignee: BHS INTRALOGISTICS GMBH, Mintraching (DE)

( * ) Notice: Subject to any disclaimer, the term of this patent is extended or adjusted under 35 U.S.C. 154(b) by 4 days.

(21) Appl. No.: 16/783,386

(22) Filed: Feb. 6, 2020

(65) Prior Publication Data

US 2020/0255235 A1     Aug. 13, 2020

(30) Foreign Application Priority Data

Feb. 7, 2019   (DE) ..................... 10 2019 201 598.0

(51) Int. Cl.
| | |
|---|---|
| *B65G 67/24* | (2006.01) |
| *B65G 65/00* | (2006.01) |
| *B65G 69/00* | (2006.01) |
| *B65G 69/28* | (2006.01) |
| *B66F 9/06* | (2006.01) |

(Continued)

(52) U.S. Cl.
CPC .......... *B65G 67/24* (2013.01); *B65G 65/005* (2013.01); *B65G 69/006* (2013.01); *B65G 69/2876* (2013.01); *B66F 9/063* (2013.01); *B66F 9/0755* (2013.01); *B66F 9/07581* (2013.01); *B66F 9/184* (2013.01); *B66F 9/22* (2013.01);

(Continued)

(58) Field of Classification Search
CPC .... B65G 67/24; B65G 69/006; B65G 65/005; B66F 9/063; B66F 9/0755; B66F 9/07581
See application file for complete search history.

(56) References Cited

U.S. PATENT DOCUMENTS

| | | | |
|---|---|---|---|
| 4,950,118 A | 8/1990 | Mueller et al. | |
| 6,439,826 B1 * | 8/2002 | Jordan ................... | B25J 13/082 294/907 |

(Continued)

FOREIGN PATENT DOCUMENTS

| | | |
|---|---|---|
| DE | 100 05 220 A1 | 8/2001 |
| DE | 10 2006 014 532 A1 | 10/2007 |

(Continued)

OTHER PUBLICATIONS

Bouguerra A et al: "An autonomous robotic system for load transportation." 2009 IEEE Conference on Emerging Technologies & Factory Automation : ETFA 2009 ; Palma De Mallo RCA, Spain, Sep. 22-25, 2009, IEEE, Ptscataway, NJ, USA, Sep. 22, 2009 (Sep. 22, 2009), pp. 1-4, XP031575813 , ISBN: 978- I -4244-27 27 -7.

(Continued)

*Primary Examiner* — Kaitlin S Joerger
(74) *Attorney, Agent, or Firm* — McGlew and Tuttle, P.C.

(57) ABSTRACT

The invention relates to a delivery system having a delivery goods vehicle for delivering inward goods, and having at least one automated transfer assembly which for transferring the goods in an automated manner from the delivery goods vehicle to a goods store comprises an object detection device. The delivery system moreover has a safety installation for securing a movement range of the transfer assembly when unloading the goods.

29 Claims, 21 Drawing Sheets

(51) Int. Cl.
*B66F 9/075* (2006.01)
*B66F 9/18* (2006.01)
*B66F 9/22* (2006.01)
*G05D 1/02* (2020.01)
*G06Q 50/28* (2012.01)

(52) U.S. Cl.
CPC ... *G05D 1/0238* (2013.01); *B65G 2201/0232* (2013.01); *G06Q 50/28* (2013.01)

(56) References Cited

U.S. PATENT DOCUMENTS

| | | | | |
|---|---|---|---|---|
| 6,454,511 | B1* | 9/2002 | Jordan | B25J 13/082 |
| | | | | 414/621 |
| 8,210,791 | B2* | 7/2012 | Chilson | G05D 1/024 |
| | | | | 414/809 |
| 8,339,260 | B2 | 12/2012 | Krieger et al. | |
| 10,061,310 | B2* | 8/2018 | Viereck | B66F 9/063 |
| 2001/0039464 | A1* | 11/2001 | Hackauf | B66F 9/184 |
| | | | | 700/213 |
| 2005/0244259 | A1* | 11/2005 | Chilson | B66F 9/085 |
| | | | | 414/664 |
| 2008/0127435 | A1 | 6/2008 | Maly et al. | |
| 2019/0084266 | A1* | 3/2019 | Grunwald | B31F 1/2831 |

FOREIGN PATENT DOCUMENTS

| | | | | |
|---|---|---|---|---|
| DE | 10 2008 042 813 | A1 | 4/2010 | |
| EP | 0995557 | A2 | 4/2000 | |
| EP | 3693325 | A2 * | 8/2020 | B65G 69/006 |
| EP | 3702303 | A1 * | 9/2020 | B66F 9/184 |
| WO | WO-2008098742 | A1 * | 8/2008 | B65G 63/02 |

OTHER PUBLICATIONS

Bank:OfRiver: "Karstad demo industri_1.wmv" ,29 It[Mar. 2010 (Mar. 29, 2010), p. I, XP0S49BI 123, Found on the Internet: URL: https ://www.youtube.com/watch?v=pP-_hOddV-w&feature=emb_ logo [ found on Nov. 19, 2020].

Abronsius70: "Report about the MALTA project in Swedish Television." YouTube, May 5, 2009 (May 5, 2009), p. I pp, XP0S49BI 122, Found on the Internet: URL: https ://www.youtube.com/watch?v=x m8qKt 1 jB4&feature=youtu. be [found on Nov. 19, 2020].

* cited by examiner

DELIVERY SYSTEM

CROSS-REFERENCES TO RELATED APPLICATIONS

This application claims the priority of German Patent Application, Serial No. DE 10 2019 201 598.0, filed Feb. 7, 2019, pursuant to 35 U.S.C. 119(a)-(d), the content of which is incorporated herein by reference in its entirety as if fully set forth herein.

FIELD OF THE INVENTION

The invention relates to a delivery system and to a complete plant having at least one delivery system of this type and in particular a plant, in particular a corrugated cardboard plant. The invention is furthermore directed towards a method for handling inward goods such as piece goods, in particular material rolls.

BACKGROUND OF THE INVENTION

It is generally known from the prior art for inward goods, in particular material rolls, to be handled. This is often tedious and time-consuming.

The invention is based on an object of achieving a delivery system which is particularly efficient and functionally reliable. Furthermore, a corresponding complete plant and a corresponding method are to be achieved.

This object is achieved according to the invention by a delivery system having a delivery vehicle for delivering inward goods, in particular material rolls, having an automated transfer assembly for transferring the goods in an automated manner from the delivery vehicle to a goods store, wherein the transfer assembly comprises an object detection device, and having a safety installation for securing a movement range of the transfer assembly when unloading the goods.

This object is further achieved according to the invention by a complete plant having at least one delivery system according to the invention, and in particular having a plant, in particular a corrugated cardboard plant This object is further achieved according to the invention by a method for delivering inward goods, in particular material rolls, comprising the steps:
delivering inward goods by means of a delivery vehicle;
transferring the goods in an automated manner from the delivery vehicle to a goods store by way of an automated transfer assembly which comprises an object detection device; and
securing a movement range of the transfer assembly by means of a safety installation when unloading the goods.

The core concept of the invention lies in transferring the goods in an automated manner, or self-acting manner, respectively, from the delivery goods vehicle to a goods store which is spaced apart from the delivery goods vehicle. The goods herein are unloaded from the delivery goods vehicle by means of the transfer assembly. Personnel is not required.

The object detection device leads to a particularly functionally reliable unloading of the delivery goods vehicle and prevents damage for example to said delivery goods vehicle, the transfer assembly, and/or to the goods. Said object detection device preferably operates in a non-contacting manner and is embodied, for example, as a camera or a sensor. The object detection device in relation to the delivery goods vehicle is preferably directed towards the front, the side and/or the rear.

Personnel can be particularly reliably protected on account of the safety installation. The safety installation is preferably capable of being manually activated or operated, respectively. The safety installation preferably acts in a non-contacting manner Said safety installation is embodied, for example, as an opto-electronic safety installation or as a sensor, a camera, or the like.

It is expedient for the goods to be disposed upright in the delivery goods vehicle. Said goods favourably are standing in at least one row in the longitudinal direction of the delivery goods vehicle.

The delivery goods vehicle is preferably capable of being driven and steered.

The transfer assembly is preferably embodied as an industrial truck.

The goods store is preferably accommodated in a building such as a shed.

The commercial vehicle being a commercial vehicle, in particular a truck or a rail vehicle, is preferably road-legal.

The transfer assembly comprising a gripping device for gripping the goods to be transferred, permits particularly reliable gripping and holding of the item of the goods to be transferred. Said gripping device is preferably able to be fixed in a clamping manner. The gripping device is preferably adjustable between an open position and a gripping position.

The gripping device comprising a first gripper arm installation for engaging on an item of the goods to be transferred, and a second gripper arm installation for engaging on the item of the goods to be gripped spaced apart from the first gripper arm installation, wherein the second gripper arm installation is longer in comparison to the first gripper arm installation when gripping the goods requires only extremely little space. Said gripping device is embodied so as to be asymmetrical. It is expedient for the gripper arm installations to be mutually adjustable, in particular pivotable.

The transfer assembly comprising a lifting device for lifting an item of the goods to the transferred permits unloading of the delivery goods vehicle in a manner that is particularly functionally reliable. The goods are thus also able to be lowered. The lifting device preferably has a lift mast which extends vertically.

The lifting device being embodied as a hydraulic lifting device and comprising a hydraulic fluid pressure variation detection installation for detecting a pressure variation of hydraulic fluid of the hydraulic lifting device preferably operates using hydraulic oil.

The design embodiment, in which the lifting device, upon detecting the completely raised state of an item of the goods to be transferred, lifts the goods further by at least 10 mm, preferably by at least 15 mm, prevents damage to the goods and to the delivery goods vehicle. Said goods are thus able to be readily lifted across a loading sill, fittings, or the like, of the delivery goods vehicle.

The design embodiment, in which the lifting device, upon detecting the completely raised state of an item of the goods to be transferred, lifts an item of the goods further by at most 50 mm, preferably by at most 40 mm, preferably by at most 30 mm, prevents damage to the goods and to the delivery goods vehicle, in particular to a roof of the latter.

The stop marker for predefining a nominal stopping position for the delivery vehicle is preferably disposed on the floor. Said stop marker enables in particular unloading of the delivery goods vehicle in a functionally reliable manner.

The safety installation, in which the safety installation is disposed on the transfer assembly, when in operation is moved conjointly with the transfer assembly, so to speak. Said safety installation is mobile and preferably has a variable safety range or scanning range, respectively. It is expedient for the safety range or scanning range, respectively, to be reduced when approaching the delivery goods vehicle.

The safety installation being installed in a locationally fixed manner, is embodied, for example, as a light barrier, a light grid, a light curtain, or the like. Said safety installation is immobile in relation to a hard surface/floor or a stop marker.

The releasing installation for releasing a movement range of the transfer assembly for the unloading of the goods, for activating or operating, respectively, the safety installation in terms of signaling is preferably at least temporarily connected to said safety installation. The releasing installation is preferably manually activatable.

The transfer assembly, comprising a first navigation installation and a second navigation installation which differs from the first navigation installation, is capable of navigating in a particularly rapid and reliable manner Due to the second navigation installation, having a position accuracy that is greater than that of the first navigation installation, the navigation installations differ in terms of the position accuracy, or the location accuracy, respectively, of said navigation installations. The first navigation installation serves in particular for basic navigation and, for example, has a position accuracy between 1 cm and 20 cm, preferably between 1.5 cm and 10 cm, preferably of 5 cm, preferably of 2 cm, while the second navigation installation serves in particular for precision navigation and, for example, has a position accuracy between 0.1 cm and 3 cm, preferably between 0.15 cm and 2 cm, preferably of 1 cm, preferably of 0.2 cm. The first navigation installation preferably also permits ranging of the transfer assembly.

Due to the first navigation installation being in particular constantly active when displacing the transfer assembly, in particular up to the identification of an item of the goods to be gripped, the first navigation installation is in particular constantly active when displacing the transfer assembly. This preferably also applies to an automated driverless operation of the transfer assembly as well as to a manual operation of the transfer assembly.

The transfer assembly, in which the second navigation installation is active upon the identification of an item of the goods to be gripped, is particularly efficient. For example, the second navigation installation is active in an immediate vicinity of the item of the goods to be gripped.

The goods identification device, in which the second navigation installation utilizes a goods identification device and is preferably embodied as a three-dimensional goods identification system, preferably operates in a non-contacting manner and is preferably embodied as a sensor or a camera. Said goods identification devices in particular capable of identifying the material roll to be transferred. The goods identification device is embodied, for example, as an object detection device or goods detection device, respectively, and/or goods recognition device. An operating range of the goods identification device is preferably between 20 cm and 10 m, preferably between 30 cm and 8 m.

A superordinate controller by way of items of (position) information from the first and/or the second navigation installation knows in particular the positions of all goods transferred by means of the at least one transfer assembly.

It is expedient for a position and/or orientation of the transfer assembly to be continually monitored by the navigation sensor and a superordinate controller, independently of the operating mode of said transfer assembly.

The goods are favourably embodied as material rolls, in particular paper rolls or cardboard rolls, respectively, and capable of being used in a cardboard plant for forming corrugated cardboard. Alternatively, the goods are pallets, or disposed on pallets, for example. Alternatively, said goods are embodied as pallet cages, for example.

The goods, or material rolls, respectively, can differ from one another, for example in terms of the transverse dimension or diameter, respectively, the axial extent, the material, or the like. The transverse dimension, or the diameter, respectively, of the goods or material rolls, respectively, in the store is preferably between 30 cm and 250 cm, preferably between 100 cm and 200 cm. The axial extent is favourably between 60 cm and 350 cm.

The cardboard plant having at least one delivery system according to the invention, and in particular having a plant, in particular a corrugated cardboard plant, is capable of forming a corrugated cardboard web, or corrugated cardboard sheets, respectively.

It is expedient for a transfer assembly to have a dedicated communication installation having a receiving unit for receiving external items of information or signals, respectively, which are items of travel, destination, and/or environment information, for example.

The at least one transfer assembly favourably has at least one dedicated displacement drive for, in particular directly or indirectly, driving at least one drivable running gear of said transfer assembly. The at least one transfer assembly is preferably able to be actuated in an independent manner. In particular, said at least one transfer assembly travels autonomously. Said at least one transfer assembly preferably travels without rails.

It is expedient for the transfer assembly to comprise a dedicated energy accumulator unit which is embodied, for example as a battery or rechargeable battery. The transfer assembly can preferably be steered. Said transfer assembly is preferably capable of travelling in a straight line or through curves.

The indefinite articles used in the claims do not represent a limitation in terms of quantity. For example, a multiplicity of rows having a multiplicity of goods as well as a multiplicity of personnel escape paths are preferably present.

A preferred embodiment of the invention will be described in an exemplary manner hereunder with reference to the appended drawing.

DESCRIPTION OF THE PREFERRED EMBODIMENT

Figure 1:
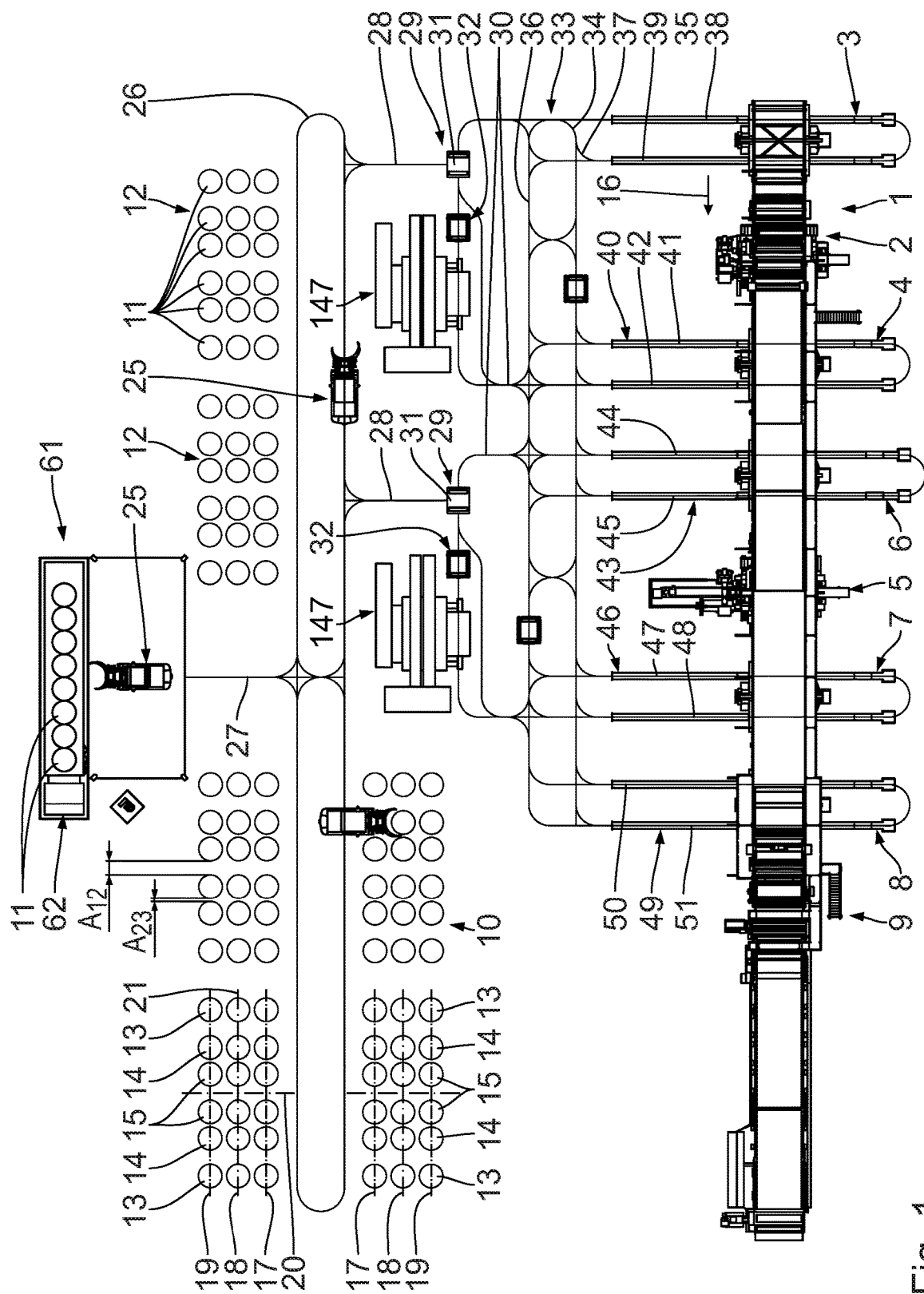
FIG. 1 shows a simplified plan view of a complete plant according to the invention.

A complete plant shown in FIG. 1 comprises a corrugated cardboard plant 1 which according to this preferred embodiment extends so as to be substantially rectilinear.

The corrugated cardboard plant 1 has a first corrugated cardboard production device 2 for producing a first corrugated cardboard web laminated on one side.

A first cover web splicing device 3 and a first intermediate web splicing device 4 are disposed upstream of the first corrugated cardboard production device 2. The first cover web splicing device 3 for unwinding a finite first cover web from a first cover web roll comprises a first unwinding unit, and for unwinding a finite second cover web from a second cover web roll comprises a second unwinding unit. The finite first cover web and second cover web for providing a continuous first cover web are connected to one another by means of a connecting and cutting unit of the first cover web splicing device 3.

The first intermediate web splicing device 4 is configured so as to correspond to the first cover web splicing device 3. The former for unwinding a finite first intermediate web from a first intermediate web roll comprises a third unwinding unit, and for unwinding a finite second intermediate web from a second intermediate web roll comprises a fourth unwinding unit. The finite first intermediate web and second intermediate web for providing a continuous first intermediate web are connected to one another by means of a connecting and cutting unit of the first intermediate web splicing device 4.

The continuous first cover web and the continuous first intermediate web are fed to the first corrugated cardboard production device 2.

The first corrugated cardboard production device 2 for generating from the continuous first intermediate web a continuous first corrugated cardboard web with a corrugation comprises a first corrugated roller assembly having a first corrugated roller and a second corrugated roller. The corrugated rollers for guiding through and corrugating the continuous first intermediate web configure a first roller gap.

The first corrugated cardboard production device 2 for connecting the continuous first cover web to the continuous corrugated first intermediate web, or corrugated web, so as to form the continuous first corrugated cardboard web laminated on one side, has a first glue application installation which preferably comprises a glue metering roller, a glue container, and a glue application roller. The glue application roller conjointly with the first corrugated roller configures a gap for guiding through and gluing the continuous first corrugated web. The glue situated in the glue container, by way of the glue application roller, is applied to peaks of the corrugation of the continuous first corrugated web. The glue metering roller bears on the glue application roller and serves for configuring a uniform glue layer on the glue application roller.

In the first corrugated cardboard production device 2 for producing the corrugated cardboard web laminated on one side, the continuous first cover web is subsequently joined to the continuous first corrugated web provided with glue from the glue container.

The first corrugated cardboard production device 2, for pressing the continuous first cover web against the continuous first corrugated web which is provided with glue and which in turn in regions bears on the first corrugated roller, has a first contact pressure module. The first contact pressure module is favourably embodied as a contact pressure belt module. Said first contact pressure module is disposed above the first corrugated roller. The first contact pressure module has two first deflection rollers as well as a continuous first contact pressure belt which is guided about the two first deflection rollers.

The first corrugated roller in regions engages from below into a space between the two first deflection rollers of the first contact pressure module, on account of which the first contact pressure belt is deflected by the first corrugated roller. The first contact pressure belt pushes against the continuous first cover web which in turn is pressed against the continuous first cover web which is provided with glue and bears on the first corrugated roller.

In order for the continuous first corrugated cardboard web laminated on one side to be temporarily stored and buffered, said corrugated cardboard web by way of a first elevated transport installation is fed to a first accumulator device where said first corrugated cardboard web forms loops.

The corrugated cardboard plant 1 furthermore has a second corrugated cardboard production device 5 which is configured so as to correspond to the first corrugated cardboard production device 2.

A second cover web splicing device 6 and a second intermediate web splicing device 7 which are configured so as to correspond to the first cover web splicing device 3, or to the intermediate web splicing device 4, respectively, are disposed upstream of the second corrugated cardboard production device 5.

The second cover web splicing device 6 for unwinding a finite third cover web from a third cover web roll comprises a fifth unwinding unit, and for unwinding a finite fourth cover web from a fourth cover web roll comprises a sixth unwinding unit. The finite third cover web and the fourth cover web for providing a continuous second cover web are connected to one another by means of a connecting and cutting unit of the second cover web splicing device 6.

The second intermediate splicing device 7 for unwinding a finite third intermediate web from a third intermediate web roll comprises a seventh unwinding unit, and for unwinding a finite fourth intermediate web from a fourth intermediate web roll comprises an eighth unwinding unit. The finite third intermediate web and fourth intermediate web for providing a continuous second intermediate web are connected to one another by means of a connecting and cutting unit of the second intermediate web splicing device 7.

The second corrugated cardboard production device 5 is capable of generating from the continuous second cover web and intermediate web a continuous second corrugated cardboard web laminated on one side.

The second corrugated cardboard web laminated on one side is fed to a second accumulator device where said second corrugated cardboard web forms loops.

The corrugated cardboard plant 1 moreover has a lamination web splicing device 8 which for unwinding a finite first lamination web from a first lamination web roll comprises a ninth unwinding unit, and for unwinding a finite second lamination web from a second lamination web roll comprises a tenth unwinding unit. The finite first lamination web and the finite second lamination web for providing a continuous lamination web are connected to one another by means of a connecting and cutting unit of the lamination web splicing device 8.

The corrugated cardboard plant 1, downstream of the accumulator devices and of the lamination web splicing device 8, has a preheating device (not illustrated) which comprises three preheating rollers that are disposed on top of one another. The continuous corrugated cardboard webs laminated on one side and the continuous lamination web are fed to the preheating rollers.

The corrugated cardboard plant 1, downstream of the preheating device, has a gluing unit (not illustrated) having gluing rollers which are partially submerged in a respective glue bath. A glue metering roller bears on each gluing roller so as to configure a uniform glue layer on the neighbouring gluing roller. The first corrugated cardboard web laminated on one side, by way of the corrugated web thereof, is in contact with a first gluing roller such that the corrugation of said corrugated web is provided with glue from the glue bath. The second corrugated cardboard web laminated on one side, by way of the corrugated web thereof, is in contact with a second gluing roller such that the corrugation of this corrugated web is provided with glue from the associated glue bath.

The corrugated cardboard plant 1, downstream of the gluing unit, has a connecting device 9 which is configured as a heated contact pressure device and comprises a horizontally running heated table. A continuous contact pressure webbing which is guided about guide rollers is disposed so as to neighbour the heated table. A contact pressure gap through which the corrugated cardboard webs laminated one side and the continuous lamination web are guided while forming a continuous corrugated cardboard web, presently comprising 5 plies, is configured between the contact pressure webbing and the heated table.

The corrugated cardboard plant 1, downstream of the connecting device 9, has a short transverse cutting device (not illustrated).

The corrugated cardboard plant 1, downstream of the short transverse cutting device, comprises a longitudinal cutting/grooving device (not illustrated).

The corrugated cardboard plant 1, downstream of the longitudinal cutting/grooving device, has a transverse cutting device (not illustrated) so as to generate sheets from the continuous corrugated cardboard web, or from part-webs of the latter.

A conveyor belt installation (not illustrated) for the onward conveying of the sheets is disposed downstream of the transverse cutting device. A depositing device (not illustrated) for forming sheet stacks is disposed downstream of the conveyor belt installation.

The complete plant, so as to be spaced apart from the corrugated cardboard plant 1, has a material roll store 10 in which a multiplicity of material rolls 11 are situated. The material rolls can be used in the splicing devices 3, 4, 6, 7, 8. Said material rolls 10 in the material roll store 10 are gathered so as to form groups 12 which are disposed so as to be mutually spaced apart. For example, the material rolls 11 are identically disposed in the individual groups 12.

The material rolls 11 are disposed so as to be standing in the material roll store 10. Said material rolls 11 herein at the end side are supported in relation to a hard surface or ground, respectively, the latter being, for example, a shed floor and also supporting the corrugated cardboard plant 1.

Each group 12 has a first row 13 having material rolls 11. A second row 14 having material rolls 11 extends in each group 12, so as to neighbour the first row 13. A third row 15 having material rolls 11 extends in each group 12, so as to neighbour the second row 14. In the case of a fully populated material roll store 10, there are preferably identical numbers of material rolls 11 in each row 13, 14, 15.

In the case of this preferred embodiment shown, three material rolls 11 are present per row 13, 14, 15. Alternatively, another number of material rolls 11 per row 13, 14, 15 is possible. Alternatively, the number of material rolls 11 per row 13, 14, 15 is dissimilar.

The rows 13, 14, 15 having material rolls 11 run so as to be mutually parallel. Said rows 13, 14, 15 extend so as to be perpendicular to a longitudinal direction, or conveying direction, respectively, 16 of the corrugated cardboard plant 1. Central axes, or longitudinal axes, respectively, of the material rolls 11 disposed therein are thus situated in a common vertical longitudinal plane in each row 13, 14, 15. The vertical longitudinal planes of the rows 13, 14, 15 run so as to be mutually parallel and extend so as to be perpendicular to the corrugated cardboard plant 1.

The material rolls 11 disposed in the various rows 13, 14, 15 are situated in different transverse planes 17, 18, 19 which run so as to be mutually parallel and which include the individual central axis, or longitudinal axis, respectively, of the material rolls 11 disposed in the respective row 13, 14, 15, and run so as to be perpendicular to the longitudinal planes.

The mutual horizontal spacing of the material rolls 11 disposed in a row 13, 14, 15 is identical. Alternatively, the material rolls 11 disposed in a row 13, 14, 15 contact one another.

The material rolls 11 disposed in the first row 13 have a first minimum spacing $A_{12}$ from the material rolls 11 disposed in the neighbouring second row 14, said spacing $A_{12}$ being between maximum diameter regions of material rolls 11 that are disposed so as to neighbour one another. The minimum spacing $A_{12}$ thus is present between external sides, or circumferential regions, respectively, of material rolls 11 in the first and the second row 13, 14. A first delimitation line of the minimum spacing $A_{12}$ is formed by a first tangent of the material rolls 11 disposed in the first row 13. A second delimitation line of the minimum spacing $A_{12}$ is formed by a second tangent of the material rolls 11 disposed in the second row 14.

The material rolls 11 disposed in the second row 14 have a second minimum spacing $A_{23}$ from the material rolls 11 disposed in the neighbouring third row 15, said spacing $A_{23}$ being between maximum diameter regions of material rolls 11 disposed so as to neighbour one another. The minimum spacing $A_{23}$ is thus present between external sides, or circumferential regions, respectively, of material rolls 11 in the second and the third row 14, 15. A first delimitation line of the minimum spacing $A_{23}$ is formed by a first tangent of the material rolls 11 disposed in the second row 14. A second delimitation line of the minimum spacing $A_{23}$ is formed by a second tangent of the material rolls 11 disposed in the third row 15.

The minimum spacings $A_{12}$ and $A_{23}$ differ significantly from one another. The minimum spacing $A_{12}$ is significantly larger than the minimum spacing $A_{23}$. The minimum spacing $A_{12}$ according to this embodiment is 87.5 cm. Said spacing $A_{12}$ is preferably between 50 cm and 90 cm and in particular enables personnel to escape. The minimum spacing $A_{23}$ is preferably between 0 cm and 30 cm. Said spacing $A_{23}$ is favourably as small as possible, thus 0 cm, so as to utilize the area of the material roll store 10 in an optimal manner. The minimum spacing $A_{23}$ is thus in particular a function of a geometric embodiment of a transfer assembly for transferring the material rolls 11, the gripping device of said transfer assembly, or the first gripper arm installation and/or the second gripper arm installation of said transfer assembly, respectively. The gripping device has in particular to be capable of reliably receiving the material roll(s) 11. For example, a (protruding) width of a frame of the transfer assembly is to be taken into account in order for the material roll(s) 11 to be gripped can be safely reached.

The material rolls 11 of each group 12 are disposed so as to be symmetrical in relation to a first symmetry plane 20 which extends so as to be parallel with the rows 13, 14, 15. Said symmetry plane 20 extends between two third rows 15 which there are disposed so as to neighbour one another.

Furthermore, the material rolls 11 of each group 12 are disposed so as to be symmetrical in relation to a second symmetry plane 21 which extends so as to be perpendicular to the first symmetry plane 20 in the central transverse plane 18.

Figure 11:
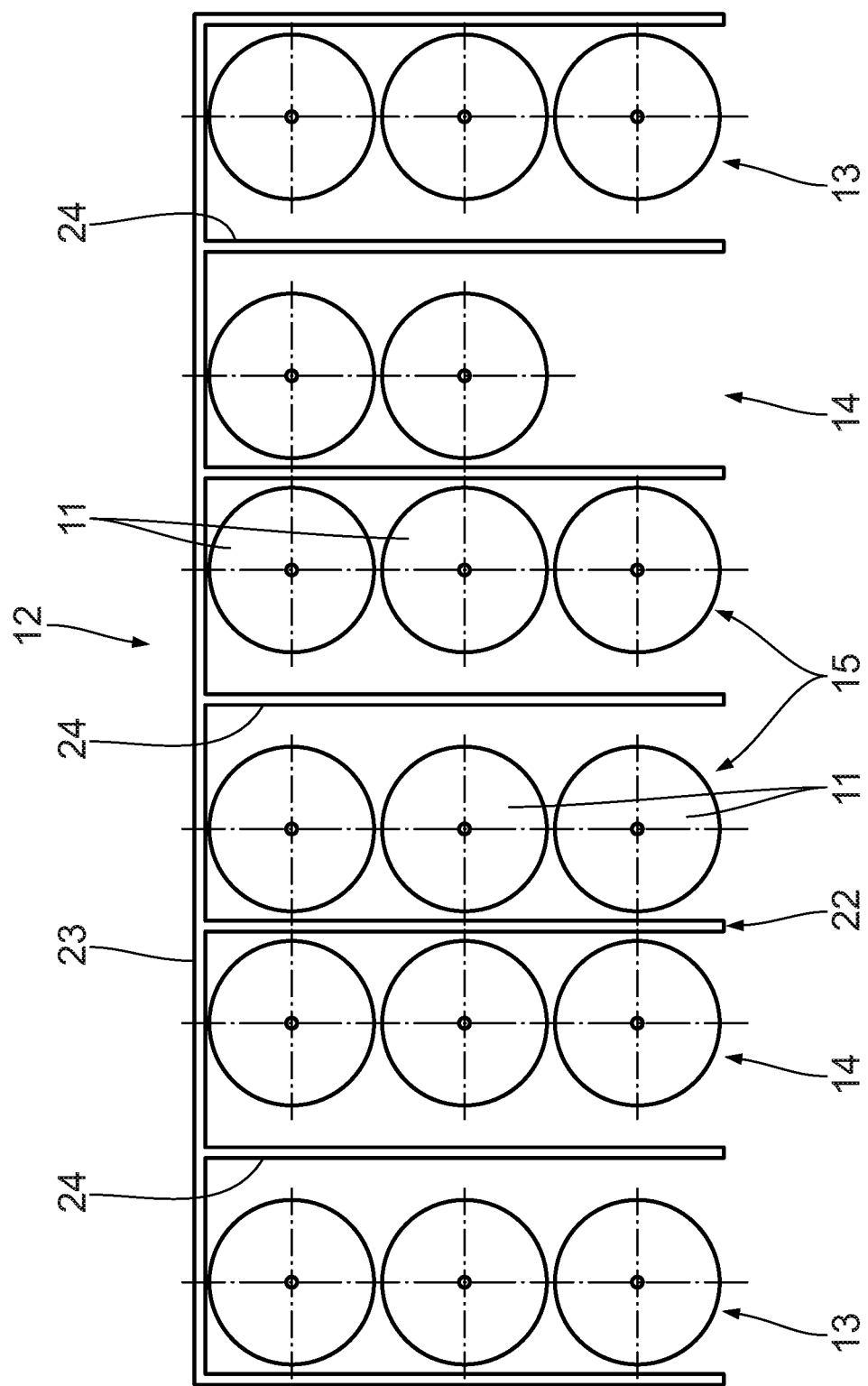
FIG. 11 shows a plan view of the material roll store shown in FIG. 10.
Figure 12:
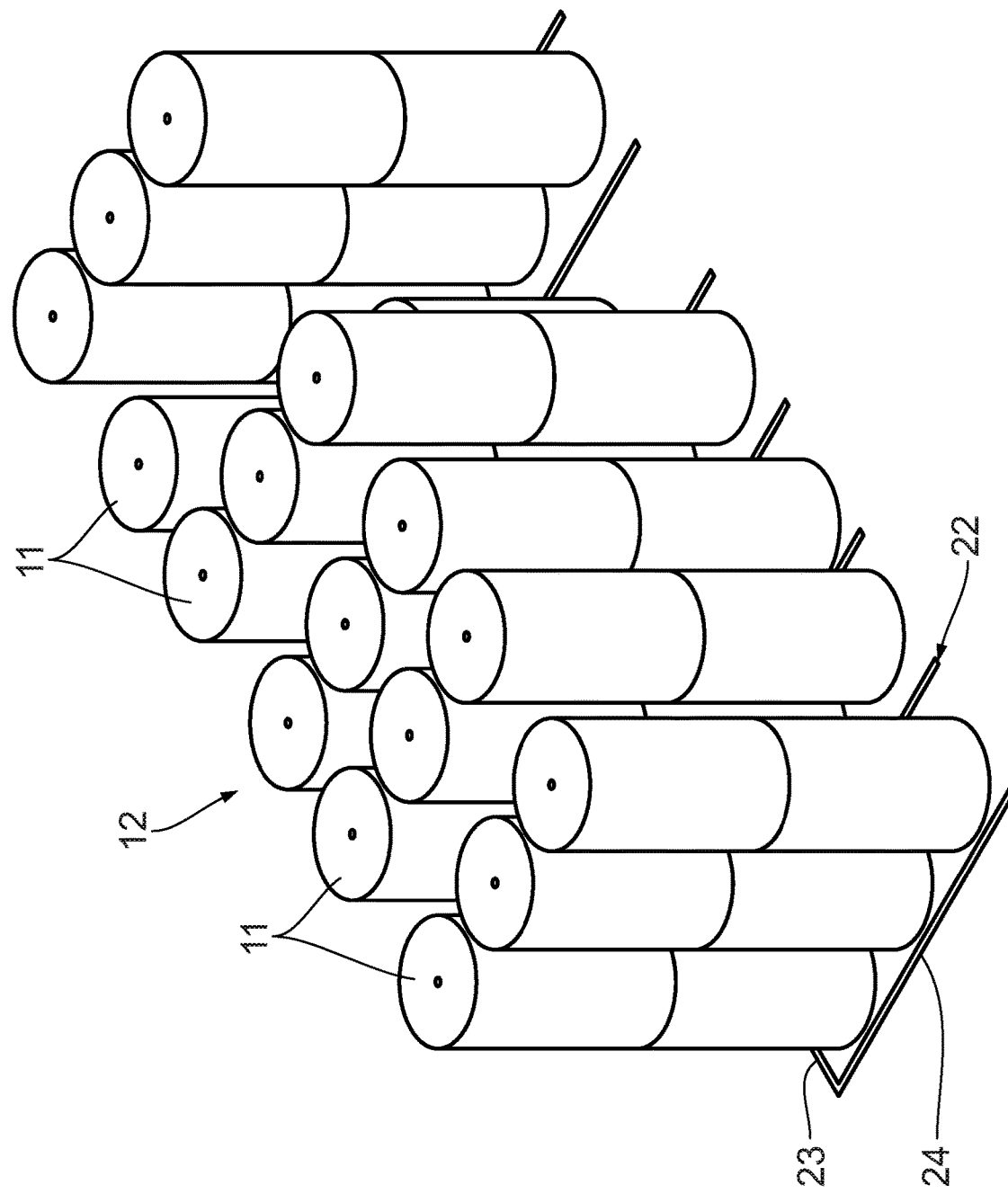
FIG. 12 shows a perspective view of the material roll store shown in FIGS. 10, 11.

As is shown in FIGS. 11, 12, each row 13, 14, 15 is disposed within a marker 20 on the floor which has a marking base 23 and marking subdivision legs 24 which project from the marking base 23. The marking bases 23 are in mutual alignment. The marking subdivision legs 24 run so as to be mutually parallel and perpendicular to the marking base 23. Said marking subdivision legs 24, proceeding from the marking base 23, are of identical length.

The material rolls 11 can be removed from the material roll store 10 by way of automated, or driverless, respectively, transfer assemblies 25 (see FIGS. 6 to 9, for example).

As is shown in FIG. 1, a closed transfer assembly circuit path 26 which extends along the mutually opposite first transverse plane 17 of the respective groups 12 is present. The transfer assembly circuit path 26 comprises two continuous sub-circuit paths that are disposed beside one another. Said transfer assembly circuit path 26 is connected to a transfer assembly primary path 27 which between individual groups 12 extends perpendicularly to the longitudinal direction, or conveying direction, respectively, 16 of the corrugated cardboard plant 1, and runs between the sub-circuit paths. Alternatively, a transfer assembly path 26 which can be travelled in opposite directions is present instead of a transfer assembly circuit path 26.

Two transfer assembly transverse paths 28 which extend perpendicularly to the longitudinal direction, or conveying direction, respectively, 16 of the corrugated cardboard plant 1 adjoin the transfer assembly circuit path 26 on a side that faces the corrugated cardboard plant 1. Each transfer assembly transverse path 28 is connected to a transfer system 29 (FIG. 1).

The transfer assembly circuit path 26 and the transfer assembly primary path 27, as well as the transfer assembly transverse path 28, are preferably purely theoretic and are preferably determined by way of a navigation by software. The paths 26, 27, 28 are deviated from in the event of obstacles or oncoming traffic.

The transverse systems 29 are of identical configuration. Each transfer system 29 has a transfer region 31 in which a material roll 11 transferred by a transfer assembly 25 can be transferred to a transport truck 32 for the onward transportation of the material roll 11 to the corrugated cardboard plant 1 (FIG. 1).

Transport truck displacement path markers 33 which indicate and predefine the displacement paths of the transport trucks 32 in the corrugated cardboard plant 1, or neighbouring thereto, respectively, are conjointly illustrated in FIG. 1. The transport truck displacement path markers 33 are preferably visible and painted to the planar hard surface that supports the corrugated cardboard plant 1. Said transport truck displacement path markers 33 are identifiable by the transport trucks 32. The transport trucks 32 when travelling in the normal operation follow the transport truck displacement path markers 33 which comprise curves, turnouts, crossings, and straight portions.

Moreover, an allocation path 30 is connected to each transfer system 29.

Each allocation path 30 leads to a material roll preparation assembly 147 for preparing the material rolls 11 for the further machining/processing. The preparation of the respective material roll 11 comprises, for example, unpacking or exposing, respectively, said material roll 11; removing or destroying, respectively, at least one fixing feature which for preventing any unwinding of the material roll 11 fixes a free material web portion; removing at least one strapping element; removing a damaged material web portion from the material roll 11; generating a defined end contour, or edge, respectively, for the further processing on the material web; attaching at least one (splicing) adhesive piece to the material web; and/or fixing an end-side material web portion on the material roll 11.

Each material roll preparation assembly 147 for receiving a material roll 11 to be prepared, having a material web wound thereon, comprises a receiving device. The receiving device has a rotating installation for driving in a rotating manner, or pivoting, respectively, the received material roll 11 about the central axis thereof, or in the circumferential direction thereof, respectively.

Each material roll preparation assembly 147 moreover has at least one material roll preparation installation, preferably a plurality of material roll preparation installations, for preparing the received material roll 11 for the further machining/processing.

Each allocation path 30 by way of the respective material roll preparation assembly 147 and of a bypass is connected to a distribution path 34 which is configured as a circuit. The distribution path 34 extends between the corrugated cardboard plant 1 and the material roll store 11. Said distribution part 34 extends so as to be parallel with the corrugated cardboard plant 1.

A first cover web path 35 adjoins the distribution path 34. The first cover web path 35 adjoins a first distribution path portion 36 and a second distribution path portion 37 of the distribution path 34. The first cover web path 35 is quasi continuous and comprises a first cover web path portion 38 and a second cover web path portion 39. The cover web path portions 38, 39 extend so as to be mutually parallel and are in alignment with the unwinding units of the first cover web splicing device 3. The cover web path portions 38, 39 penetrate the corrugated cardboard plant 1 at each unwinding unit and beyond the corrugated cardboard plant 1 are connected to one another.

The transport trucks 32 for populating the first cover web splicing device 3 and for removing residual material rolls are displaceable in opposite directions on the first cover web path portion 38 as well as on the second cover web path portion 39. A revolving transportation of the transport trucks 32 in one direction along the first cover web path 35 in order for the first cover web splicing device 3 to be populated and a residual material roll to be removed is also possible.

A first intermediate web path 40 adjoins the distribution path 34. The first intermediate web path 40 which is quasi continuous and comprises a first intermediate web path portion 41 and a first intermediate web path portion 42 adjoins the first distribution path portion 36 and the second distribution path portion 37. The intermediate web path portions 41, 42 extend so as to be mutually parallel and parallel with the cover web path portions 38, 39. Said intermediate web path portions 41, 42 are in alignment with the unwinding units of the first intermediate web splicing device 4. The first and the second intermediate web path portion 41, 42 penetrate the corrugated cardboard plant 1 at the respective unwinding unit and beyond the corrugated cardboard plant 1 are connected to one another.

The transport trucks 32 for populating the first intermediate web splicing device 4 and removing residual material rolls are displaceable in opposite directions on the first intermediate web path portion 41 as well as on the second intermediate web path portion 42. A revolving transportation of the transport trucks 32 in one direction along the first intermediate web path 40 in order for the first intermediate web splicing device 4 to be populated and a residual material roll to be removed is also possible.

A second cover web path 43 adjoins the distribution path 34. The second cover web path 43 which is quasi continuous and comprises a first cover web path portion 44 and a second cover web path portion 45 adjoins the first distribution path portion 36 and the second distribution path portion 37. The cover web path portions 44, 45 extend so as to be mutually parallel and parallel with the cover web path portions 38, 39. Said cover web path portions 44, 45 are in alignment with the unwinding units of the second cover web splicing device 6. The first and the second cover web path portion 44, 45 penetrate the corrugated cardboard plant 1 at the respective unwinding unit and beyond the corrugated cardboard plant 1 are connected to one another.

The transport trucks 32 for populating the second cover web splicing device 6 and removing residual material rolls are displaceable in opposite directions on the first cover web path portion 44 as well as on the second cover web path portion 45. A revolving transportation of the transport trucks 32 in one direction along the second cover path 43 in order for the second cover web splicing device 6 to be populated and a residual material roll to be removed is also possible.

A second intermediate web path 46 adjoins the distribution path 34. The second intermediate web path 46 which is quasi continuous and comprises a first intermediate web path portion 47 and a second intermediate web path portion 48 adjoins the first distribution path portion 36 and the second distribution path portion 37. The intermediate web path portions 47, 48 extend so as to be mutually parallel and parallel with the cover web path portion 38, 39. Said intermediate web path portions 47, 48 are in alignment with the unwinding units of the second intermediate web splicing device 7. The first and the second intermediate web path portion 47, 48 penetrate the corrugated cardboard plant 1 at the respective unwinding unit and beyond the corrugated cardboard plant 1 are connected to one another.

The transport trucks 32 for populating the second intermediate web splicing device 7 and removing residual material rolls are displaceable in opposite directions on the first intermediate web path portion 47 as well as on the second intermediate web path portion 48. A revolving transportation of the transport trucks 32 in one direction along the second intermediate web path 45 in order for the second intermediate web splicing device 7 to be populated and a residual material roll to be removed is also possible.

A lamination web path 49 adjoins the distribution path 34. The lamination web path 49 which is quasi continuous and comprises a first lamination web path portion 50 and a second lamination web path portion 51 adjoins the first distribution path portion 36 and the second distribution path portion 37. The lamination web path portions 50, 51 extend so as to be mutually parallel and parallel with the cover web path portions 38, 39. The lamination web path portions 50, 51 are in alignment with the unwinding units of the lamination web splicing twice 8. The first and the second lamination web path portion 50, 51 penetrate the corrugated cardboard plant 1 at the respective unwinding unit and beyond the corrugated cardboard plant 1 are connected to one another.

The transport trucks 32 for populating the lamination web splicing device 8 and removing residual material rolls are displaceable in opposite directions on the first lamination web path portion 50 as well as on the second lamination web path portion 51. A revolving transportation of the transport trucks 32 in one direction along the lamination web path 49 in order for the lamination web splicing device 8 to be populated and the residual material roll to be removed is also possible.

The cover web paths 35, 43, the intermediate web paths 40, 16, and the lamination web path 49 are connected to the distribution path 34 so as to be mutually spaced apart and run so as to be mutually spaced apart.

Figure 13:
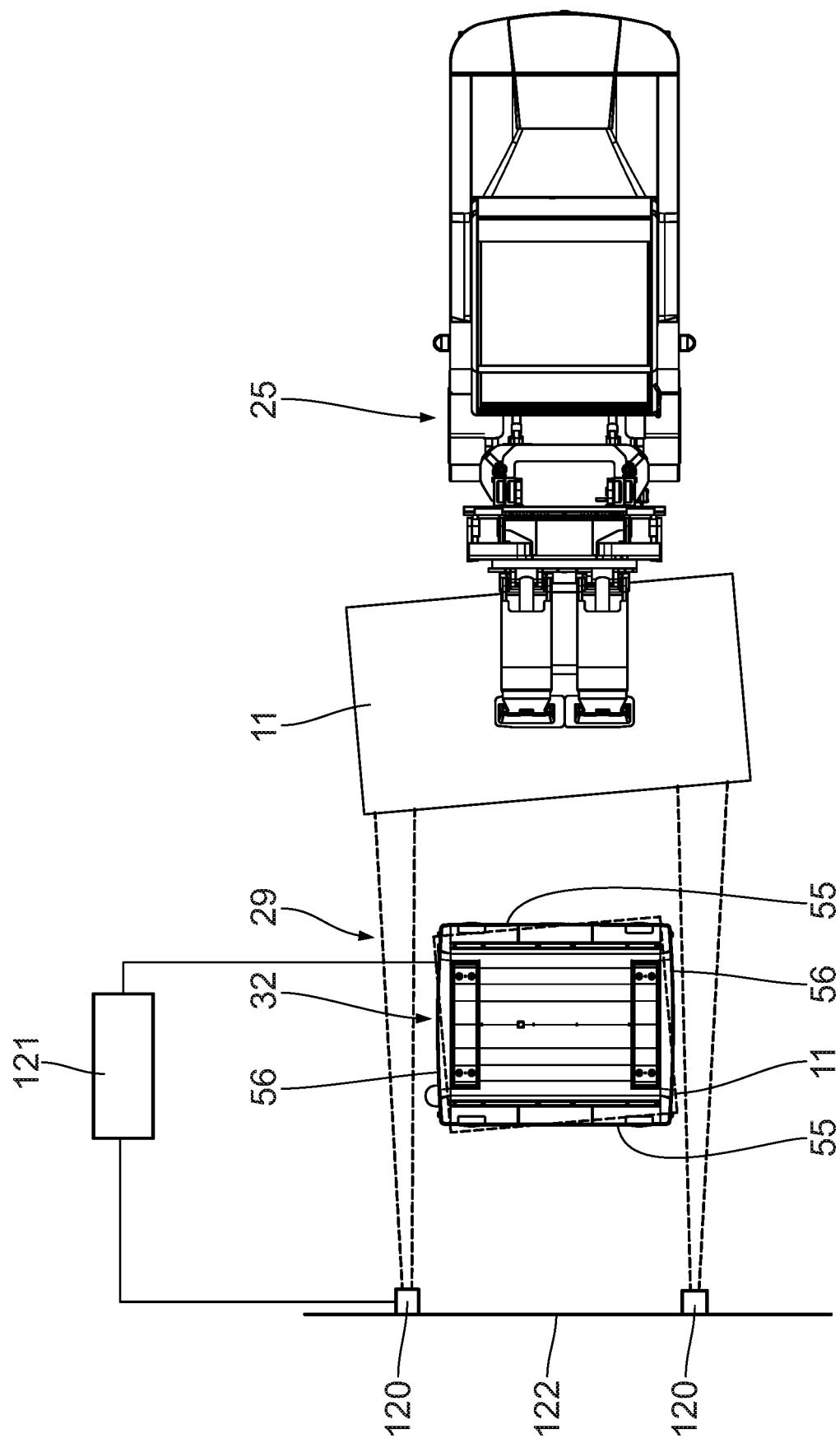
FIG. 13 shows a plan view of a transfer system for transferring a material roll to a transfer assembly of the complete plant shown in FIG. 1.
Figure 14:
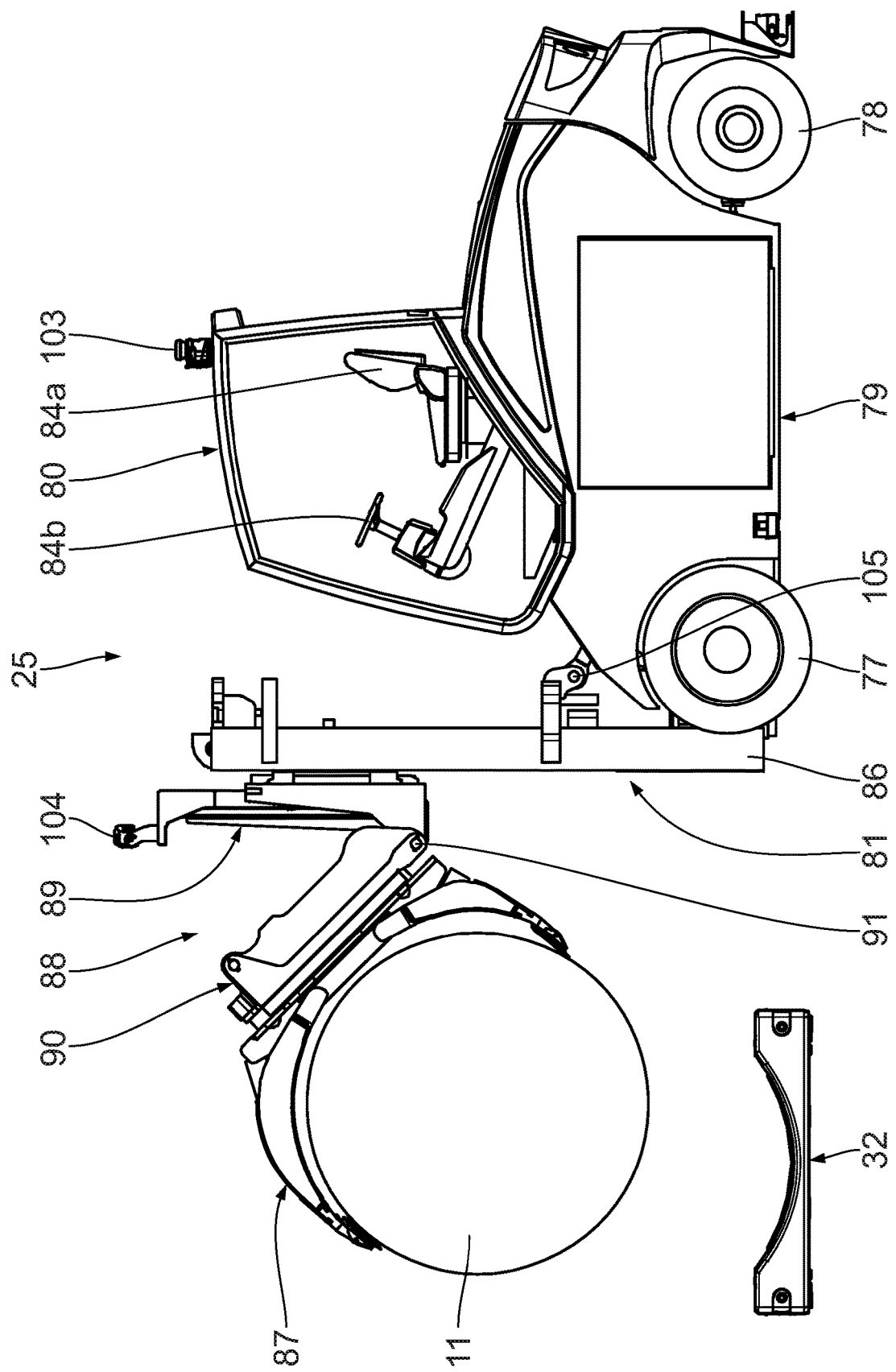
FIG. 14 shows a lateral view of the transfer system shown in FIG. 13.
Figure 15:
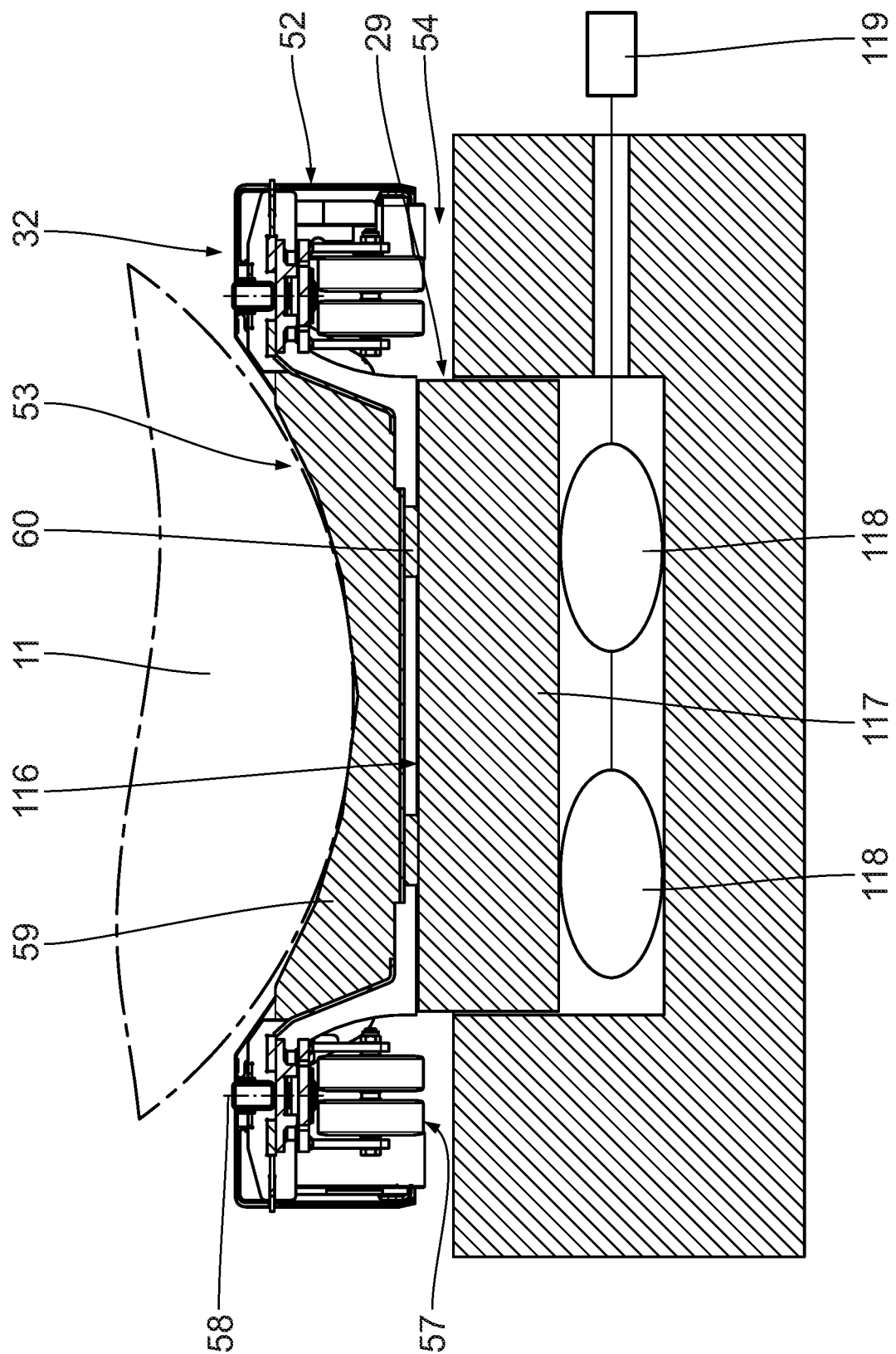
FIG. 15 shows a section through an active stress relief device of the transfer system shown in FIGS. 13, 14.

The transport trucks 32 are of identical embodiment. Each transport truck 32 has a rigid base frame 52 in the manner of frame or a chassis, respectively (FIGS. 13 to 15, for example). The base frame 52 supports a material roll receptacle 53 for a horizontal material roll 11 and a plurality of wheel units 54 for displacing the transport trucks 32 on the hard surface, as well as a communications installation (not illustrated).

The transport truck 32 can be set in motion as a function of signals, or items of information, respectively, received by way of the communications installation. Accordingly, items of information pertaining to the path or the target, respectively, can also be transmitted to the transport trucks 32. The transport truck 32 is displaceable in a rectilinear or curved manner.

The base frame 52 has two longitudinal sides 55 and two transverse sides 56. The longitudinal sides 55 run so as to be mutually parallel. Said longitudinal sides 55 extend so as to be parallel with the material roll receptacle 53. The transverse sides 56 also extend so as to be mutually parallel. The longitudinal sides 55 and the transverse sides 56 are oriented so as to be mutually orthogonal.

A discrete displacement drive (not illustrated) which comprises an electric motor is disposed on the base frame 52.

A driving wheel (not illustrated) which is rotatably mounted, or mounted so as to be drivable in rotating manner, respectively, is operatively connected to each displacement drive for driving the latter. The rotation axes of the drive wheels are in mutual alignment. Said rotation axes extend so as to be perpendicular to the longitudinal sides 55. The drive wheels are in the centre in relation to a longitudinal direction of the transport truck 32. Said drive wheels cannot be steered and are supported in relation to the hard surface when displacing the transport truck 32.

A steering wheel unit 57 which comprises in each case one twin wheel is disposed on each corner region of the base frame 52. The twin wheels are rotatably mounted. Each steering wheel unit 57 is able to be deflected in a self-acting manner about a vertical steering axis 58. The steering wheel units 57 are freely deflectable, in particular by 360°. The steering axes 58 run so as to be mutually parallel.

The material roll receptacle 53 is formed by at least one channel part 59 which is in each case mounted so as to be vertically displaceable on the base frame 52 and is open towards the top. The at least one channel part 59 extends between the longitudinal sides 55, so as to neighbour the transverse sides 56. The deepest receptacle point of said channel part 59 is situated so as to be centric between the longitudinal sides 55. Said channel part 59 is symmetrically configured. The highest point of the at least one channel part 59 neighbours the longitudinal sides 55. Said channel part 59 is open in a manner neighbouring the transverse sides 56 of the base frame 52, or in the longitudinal direction.

The material roll receptacle 53 at the bottom supports at least one horizontally running support plate 60.

Moreover, a rechargeable battery (not illustrated) is disposed on the base frame 52. The rechargeable battery is a rechargeable accumulator for electric power for the displacement drives.

Furthermore, a transport truck controller (not illustrated) which is capable of actuating the two displacement drives in a mutually independent manner is disposed on the base frame 52. The transport truck controller in terms of signalling is moreover connected to the communications installation.

The electronic, or electrical, respectively, components of the transport truck 32 are electrically connected to one another in a suitable manner.

A safety installation (not illustrated) which is embodied as a scanner, in particular a laser scanner, is furthermore disposed in a front region on the base frame 52. The safety installation in terms of signalling is connected to the transport truck controller. Said safety installation is capable of immediately stopping the transport truck 32 in the event of any danger identified.

A detection path detection installation (not illustrated) which is embodied as a sensor is disposed on the front of the base frame 52 so as to neighbour the front transverse side 56 of the transport truck 32 when being displaced. The displacement path detection installation is configured so as to be elongate and extends horizontally. Said displacement path detection installation runs so as to be perpendicular to the longitudinal direction of the transport truck 32. Said displacement path detection installation is capable of detecting a predefined displacement path and in terms of signalling is connected to the transport truck controller. Alternatively, a displacement path or a target, respectively, for the transport truck 32 can be predefined by way of software.

Furthermore, the transport truck 32 has a material roll detection sensor (not illustrated). The material roll detection sensor is capable of detecting whether the transport truck 32 is with or without a load. The material roll detection sensor is situated in the material roll receptacle 53 and in terms of signalling is connected to the transport truck controller.

The transport truck 32 can be displaced by energizing the at least one displacement drive. The required electric power emanates from the rechargeable battery. The displacement drives receive corresponding travel signals indirectly by way of the displacement path detection installation and/or by way of the communications installation.

When the two drive wheels are driven by the same measure in opposite directions the transport truck 32 rotates on the spot. When the one drive wheel is driven more intensely than the other drive wheel, the transport truck 32 thus travels through a curve. The steering wheel units 57 herein are automatically adjusted about the respective steering axis 58. When the two drive wheels are driven identically and in the same direction, the transport truck 32 thus travels straight ahead. The steering wheel units 57 are correspondingly adjusted to a straight-ahead travel.

The transfer assembly primary path 27 starts in a delivery system 61 which comprises a tractor/semi-trailer combination 62 (FIGS. 1 to 5). New material rolls 11 are delivered by the tractor/semi-trailer combination 62. The tractor/semi-trailer combination 62 comprises a tractor 63 and a semi-trailer 64.

The tractor 63 in turn has a chassis, a motor, and a transmission, as well as a coupling for the semi-trailer 64.

The semi-trailer 64 forms a trailer and comprises rear axles 65 which are supported in relation to a floor or ground, respectively. Said semi-trailer 64 has a planar loading area 66 for supporting the material rolls 11. The material rolls 11 on the loading area 66 stand longitudinally along the semi-trailer 64 in at least one row. Said material rolls 11 in the longitudinal direction of the semi-trailer 64 are disposed so as to be horizontally mutually spaced apart. Alternatively, said material rolls 10 contact one another on the circumference. The semi-trailer 64 moreover has a tarpaulin frame 67 which supports a tarpaulin 68 and spatially delimits a loading space 69. The tarpaulin 68 can be opened on the side and preferably also at the rear, this enabling access to the loading space 69. The loading space 69 in a downward manner is spatially delimited by the loading area 66.

A stop marker 70 on the floor predefines a nominal stopping position for the tractor/semi-trailer combination 62. The stop marker 70 comprises a longitudinal stopping line 71 which predefines a longitudinal nominal stopping position of the tractor/semi-trailer combination 62 in the longitudinal direction 72 thereof, or in the travel direction. The stop marker 70 moreover has two parallel transverse stopping lines 73 which run so as to be mutually spaced apart and predefine a nominal transverse stopping position perpendicular to the longitudinal direction 72, or the travel direction, respectively, of the tractor/semi-trailer combination 62. The stop marker 70 preferably has a rectangular contour which corresponds substantially to the footprint of the tractor/semi-trailer combination 62.

Figure 2:
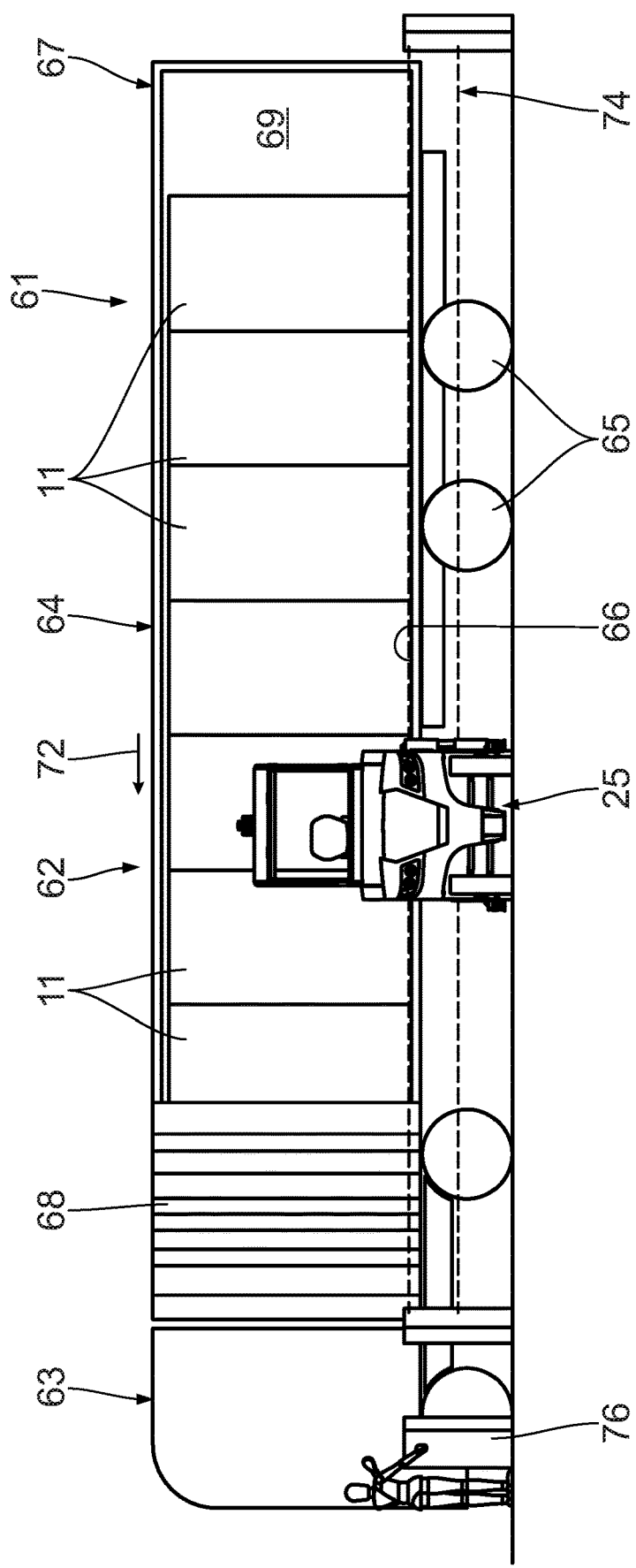
FIG. 2 shows a lateral view of a delivery system according to the invention, having a delivery goods vehicle and an automated transfer assembly of the complete plant shown in FIG. 1.
Figure 3:
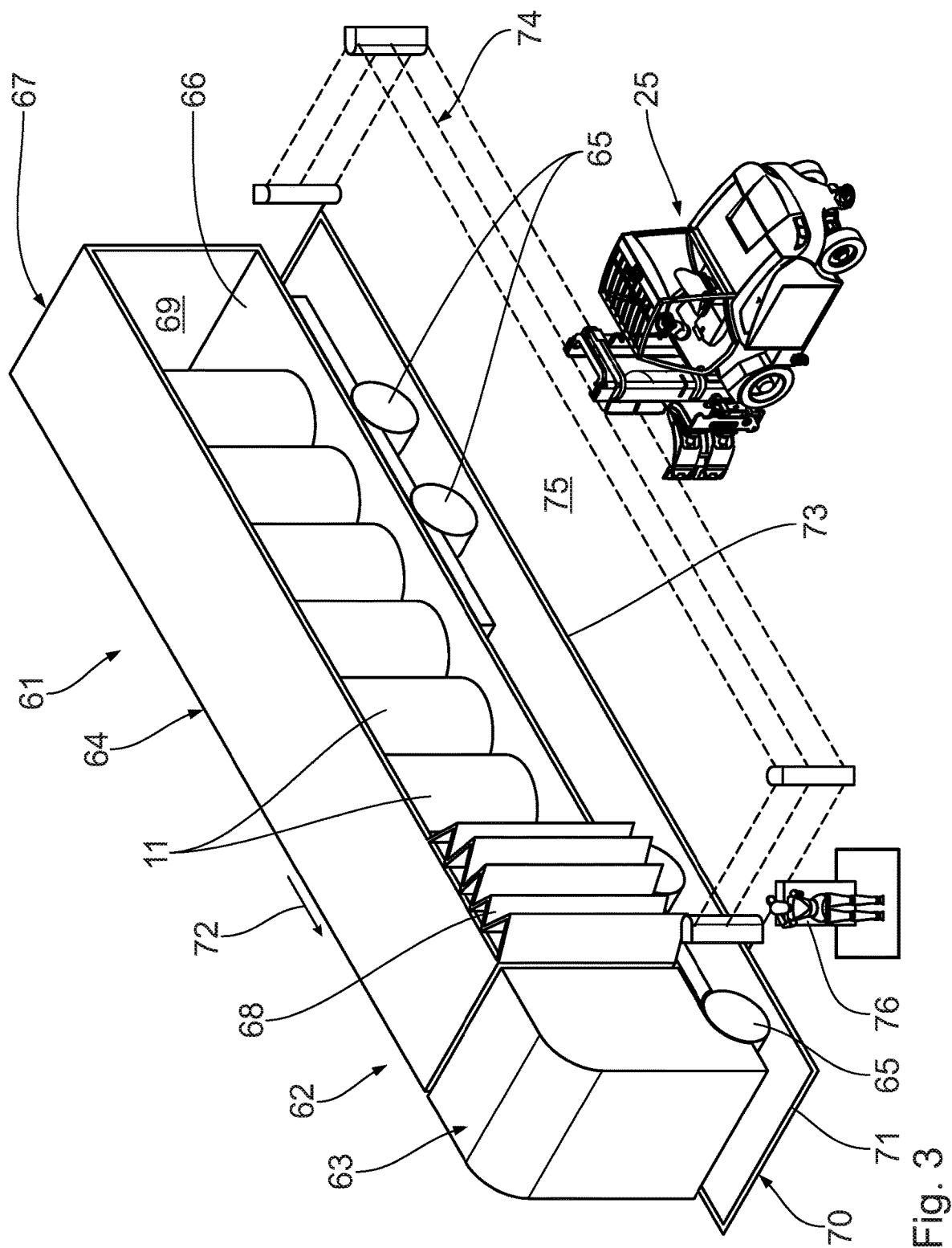
FIG. 3 shows a perspective illustration of the delivery system shown in FIG. 2.
Figure 4:
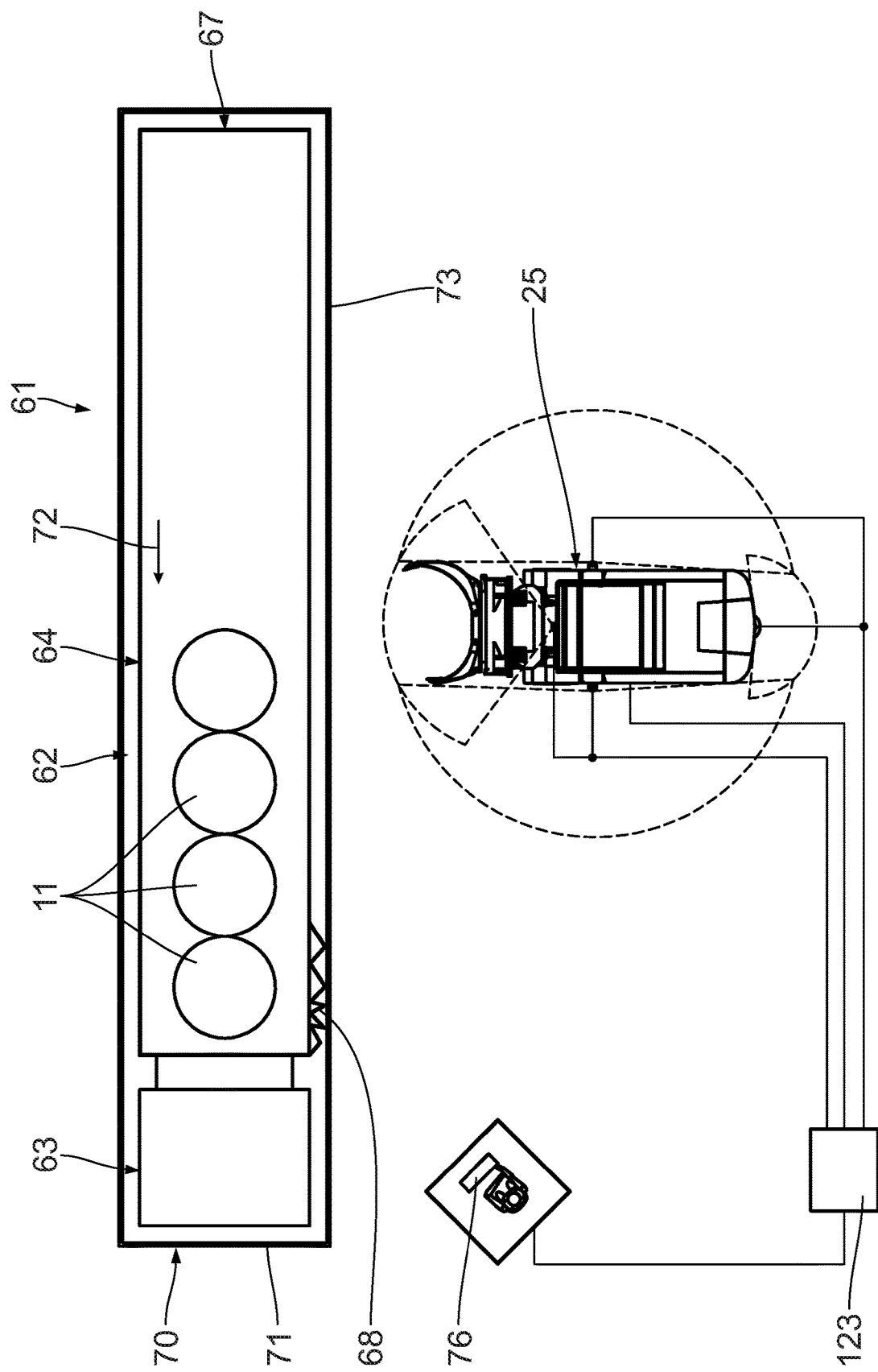
FIG. 4 shows a plan view of an alternative delivery system in which active safety installations of the transfer assembly are conjointly illustrated.
Figure 5:
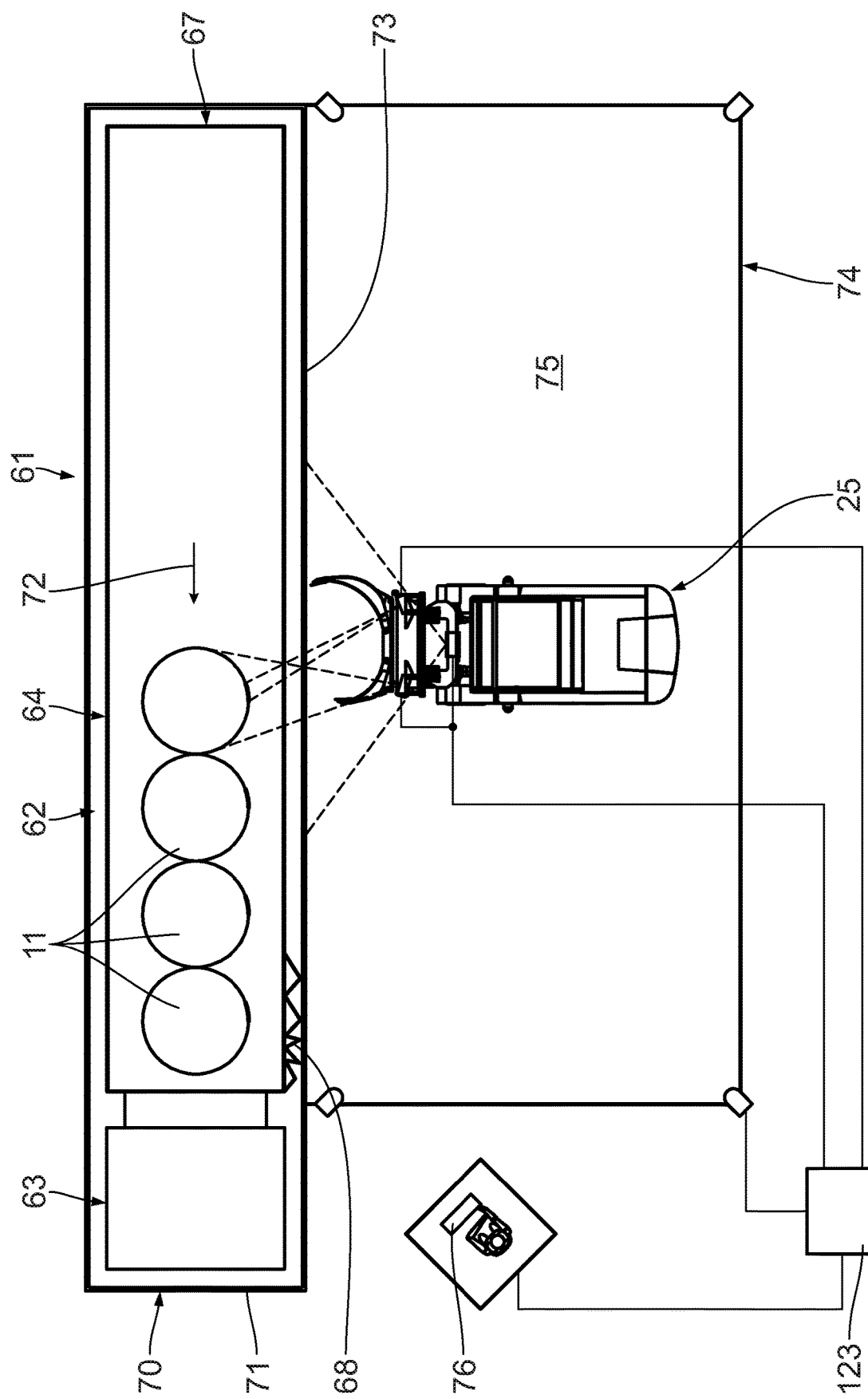
FIG. 5 shows a plan view, similar to that of FIG. 4, of the delivery system shown in FIGS. 2, 3, in which a material roll object detection installation of the transfer assembly is shown in the active state.
Figure 6:
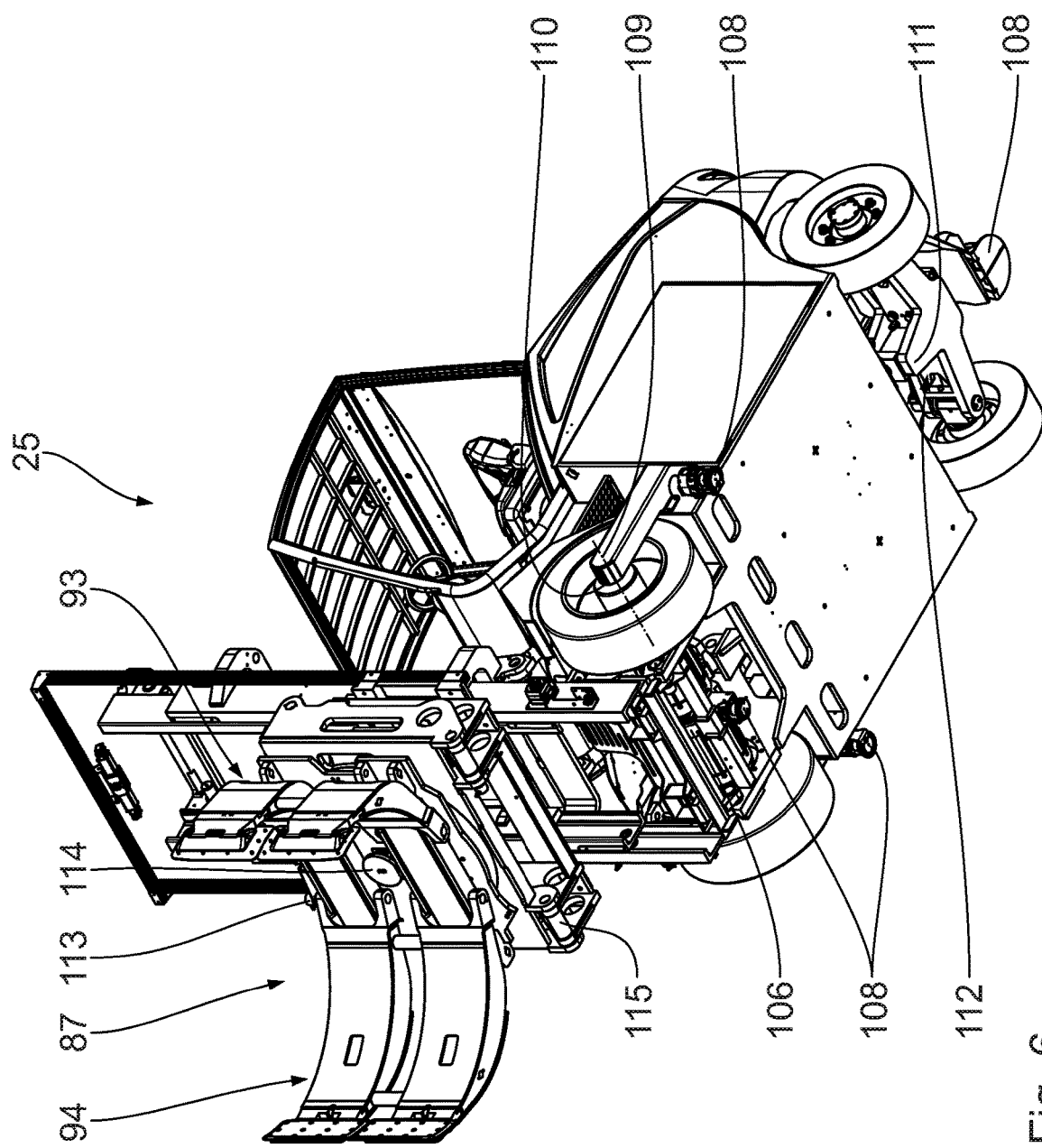
FIG. 6 shows a detailed perspective view of a transfer assembly from obliquely below.
Figure 7:
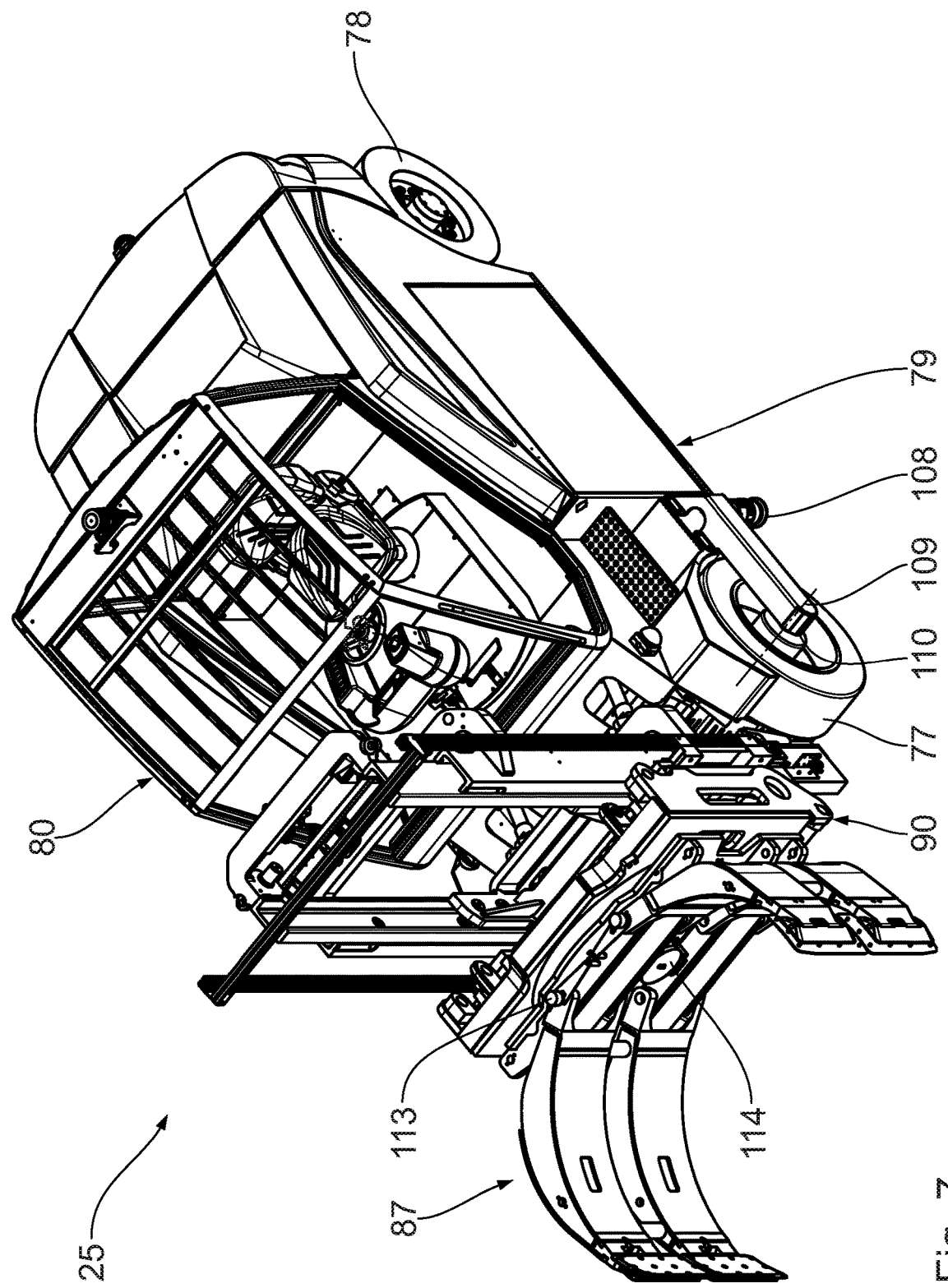
FIG. 7 shows a detailed perspective view of the transfer assembly shown in FIG. 6 from obliquely above.

The delivery system 61 according to FIGS. 2, 3, 5 moreover comprises a receiving safety installation, or unloading safety installation, respectively, 74 which is embodied as a safety light barrier and secures a receiving region, or unloading region, respectively, 75 that neighbours the tractor/semi-trailer combination 62 parked in the nominal stopping position against being entered by personnel. The receiving safety installation 74 can be activated by the driver of the tractor/semi-trailer combination 62 or by another person by way of an operator terminal 76. The operator terminal 76 in this instance is situated so as to neighbour the tractor 63. The driver, or the other person, respectively, by way of the operator terminal 76 activates the receiving safety installation 74 only once the tarpaulin 68 has been removed such that the newly received material rolls 11 can be unloaded from the tractor/semi-trailer combination 62. The transfer assembly 25 moves into the receiving region 75 only once the receiving safety installation 74 has been activated.

The transfer assembly 25 is configured as an automated, or driverless, respectively, industrial truck, or fork-lift truck, respectively (FIGS. 6 to 9). The industrial truck 25 has a frame 79 which is supported on front wheels 77 and rear wheels 78 and supports a cabin 80 and a hydraulic lifting device 81 at the front. The front wheels 77 and rear wheels 78 are supported in relation to the hard surface. The rear wheels 78 are deflectable.

The frame 79 moreover supports a battery, or a rechargeable battery, respectively (not illustrated), and at least one displacement drive (not illustrated) which is electrically connected to said battery or rechargeable battery and which is preferably operatively connected to the rear wheels 78 for driving the latter.

Figure 9:
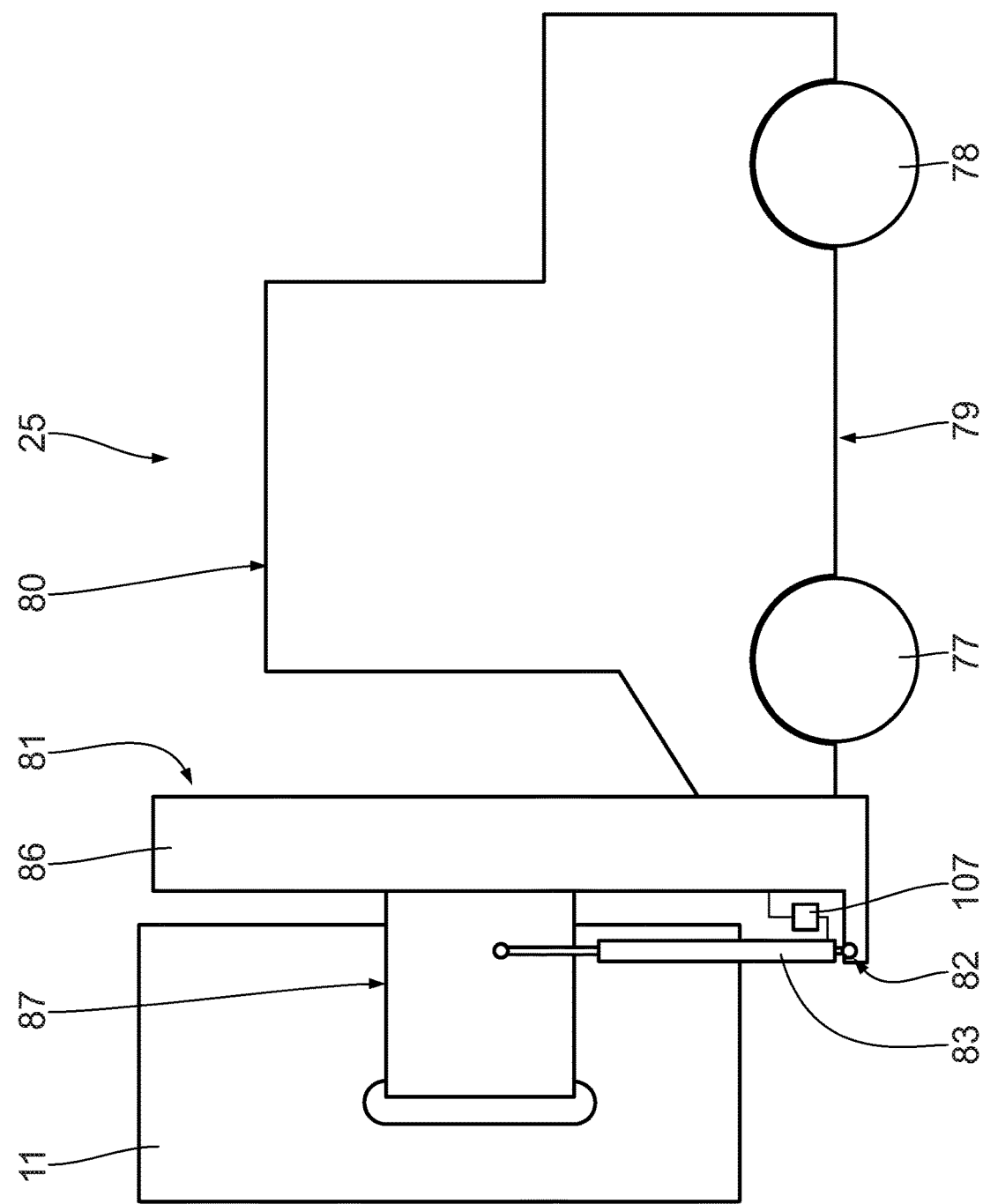
FIG. 9 shows a simplified lateral view of a transfer assembly according to FIGS. 7, 8A for visualizing a lifting device.
Figure 10:
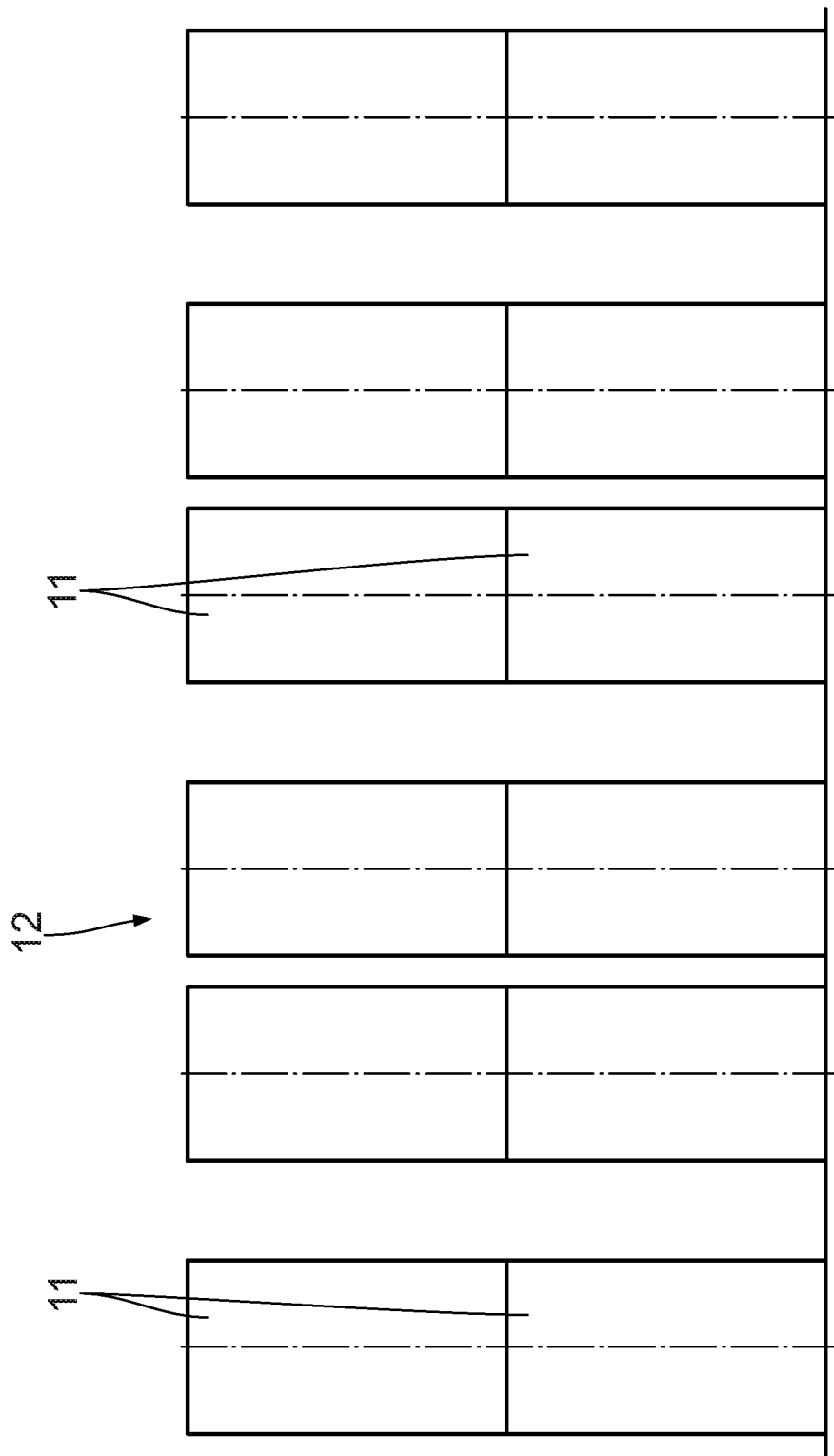
FIG. 10 shows a front view of a material roll store of the complete plant according to FIG. 1.

The frame 79 moreover supports an hydraulic apparatus 82 (FIG. 9). The hydraulic apparatus 82 in turn for supplying the hydraulic lifting device 81 with hydraulic fluid is fluidically connected to a hydraulic tank supported by the frame 79. Said hydraulic apparatus 82 comprises a hydraulic pump and a hydraulic control installation which is fluidically connected to the hydraulic pump and at least one lifting cylinder 83 of the hydraulic lifting device 81. Hydraulic oil is used in particular.

A driver seat 84a as well as operating elements of the industrial truck 25 for a driver are disposed, if required, in the cabin 80.

The hydraulic apparatus 82 preferably also serves for operating a steering installation of the industrial truck 25. A steering wheel 84b for activating the steering installation is also situated in the cabin 80. The hydraulic control installation in this instance is also fluidically connected to the steering installation. Said hydraulic control installation serves for controlling the hydraulic pump, in particular the at least one lifting cylinder 83 and the steering installation. The rear wheels 78 can be deflected by the steering installation in order for the industrial truck 25 be able to travel in a curve.

The industrial truck 25 moreover has an electrical industrial truck control unit 85 which in terms of signalling is also connected to the hydraulic control installation.

The hydraulic lifting device 81 comprises a vertically extending lift mast 86 which is disposed at the front of the industrial truck 25 and which for reliably gripping and lifting as well as holding a material roll 11 has a gripping device 87 which is displaceable in an upward and downward manner on said lift mast 86.

The gripping device 87 by way of a coupling device 88, shown in FIG. 14 for example, is disposed on the lift mast 86. The coupling device 88 comprises a connector installation 89 that is connected to the lift mast 86 and a carrying installation 90 that is movably connected to said connector installation 89. The connector installation 89 is displaceable in a guided manner along the lift mast 86. The connector installation 89 is embodied, for example, as a slide. The carrying installation 90 in relation to the connector installation 89 is pivotable about a pivot axis 91. Furthermore, the entire gripping device 87 is rotatable. Said gripping installation 87 comprises a plate-type support member 92.

Figure 8A:
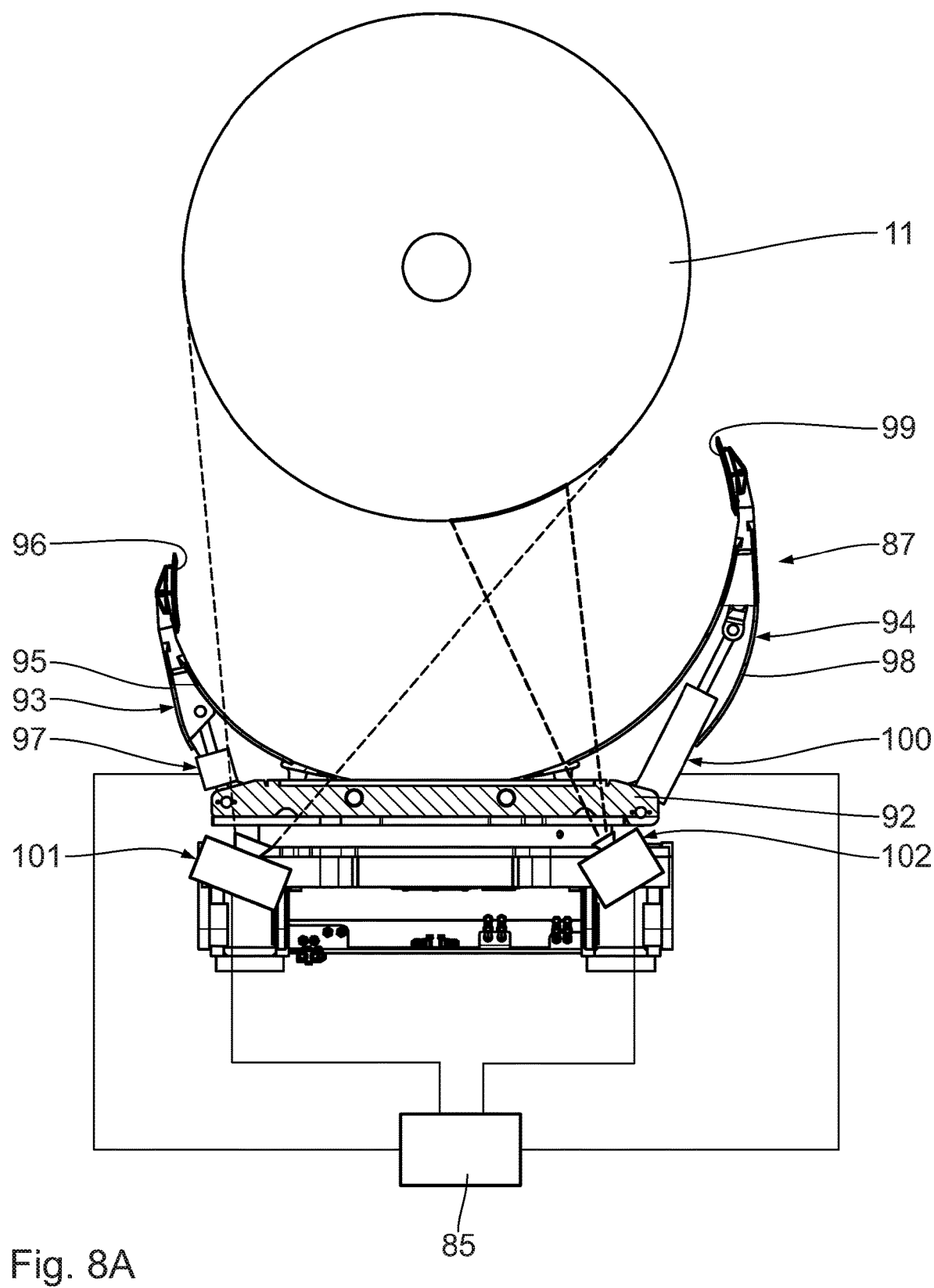
FIG. 8A shows a cross-section through a gripping device of the transfer assembly visualized in FIGS. 6, 7, including a material roll to be transferred and a material roll detection device as well as a controller.
Figure 8B:
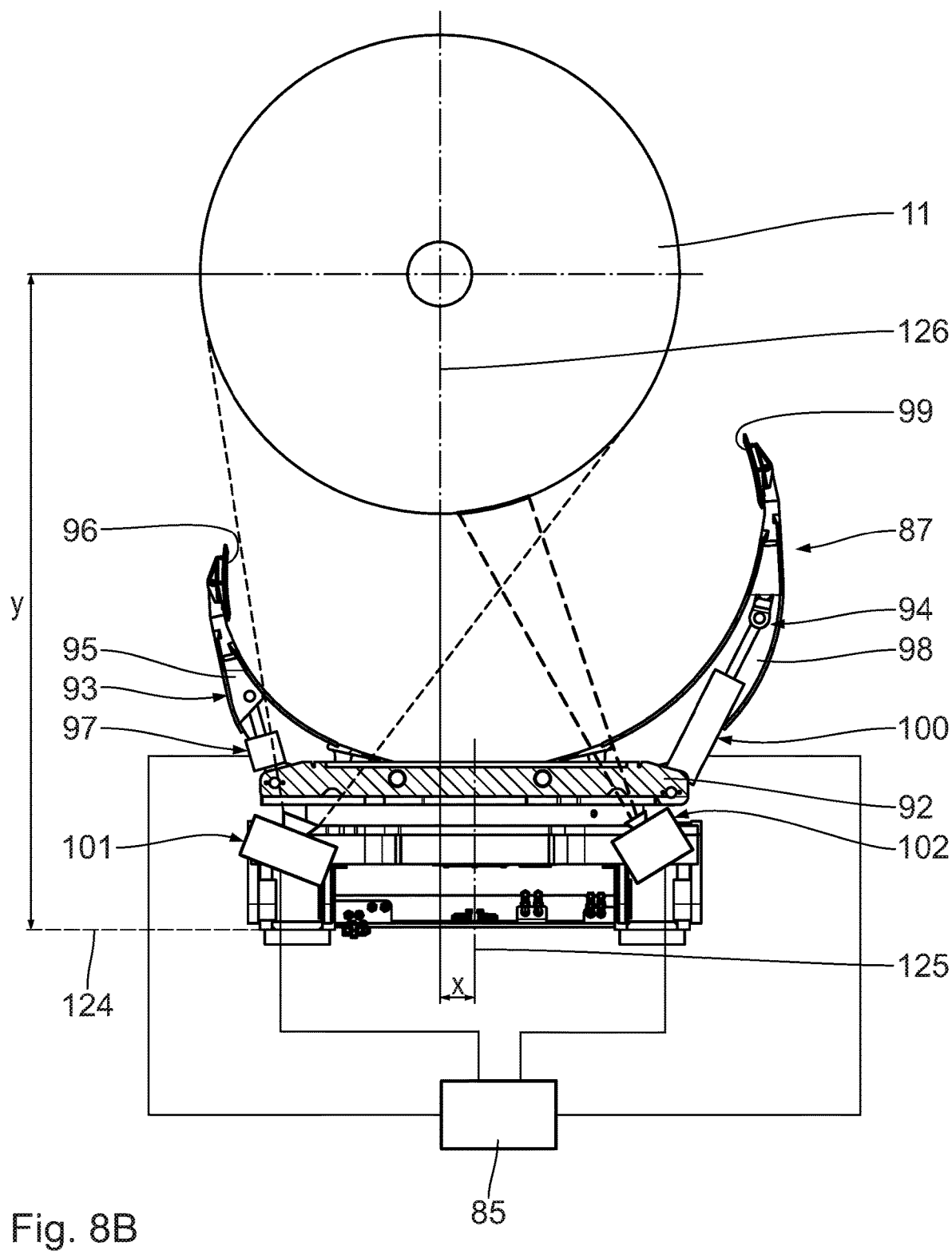
FIGS. 8B-8D show views corresponding to that of FIG. 8A which visualize a position calculation of the gripping device.

The carrying installation 90 comprises a plate-type support member 92. A first gripper arm installation 93 and a second gripper arm installation 94 are articulated on the support member 92. The gripper arm installations 93, 94 are articulated and disposed on the support member 92 so as to be mutually spaced apart. Said gripper arm installations 93, 94 have pivot axes that run so as to be mutually parallel and are pivotable relative to one another (FIG. 8A).

The first gripper arm installation 93 has a first gripper arm 95 and a first bearing jaw 96 which is disposed so as to be freely pivotable on a free end of the first gripper arm 95. The first gripper arm 95 is pivotable by way of a first length-variable adjustment cylinder unit 97. The first adjustment cylinder unit 97 is disposed between the first gripper arm 95 and the support member 92 and is connected to said first gripper arm 95 and the support member 92 in an articulated manner.

The second gripper arm installation 94 has a second gripper arm 98 and a second bearing jaw 99 which is disposed so as to be freely pivotable on a free end of the second gripper arm 98. The second gripper arm 98 is pivotable by way of a second length-variable adjustment cylinder unit 100. The second adjustment cylinder unit 100 is disposed between the second gripper arm 98 and the support member 92 and is connected to said second gripper arm 98 and the support member 92 in an articulated manner.

The gripper arms 95, 98 are curved while delimiting a material roll receptacle that is substantially shaped as a divided circle. The bearing jaws 96, 99 are favourably of identical construction. The bearing faces of said bearing jaws 96, 99 face one another.

The second gripper arm 98 is substantially longer than the first gripper arm 95. Said second gripper arm 98 is preferably at least 30%, preferably at least 40%, preferably at least 50%, longer than the first gripper arm 95. Said second gripper arm 98 is at most 120%, preferably at most 100%, preferably at most 80%, longer than the first gripper arm 95. The gripping device 87 is asymmetrical such that said gripping device 87 can be used in the tightest space. The gripper arm installations 93, 94 have dissimilar lengths or sizes, respectively. The bearing faces of the bearing jaws 96, 99 normally have dissimilar spacings from the support member 92.

Each adjustment cylinder unit 97, 100 is connected to the hydraulic control installation of the industrial truck 25 in order for the latter to be activated.

The coupling device 88 moreover supports a material roll detection device which comprises a first material roll detection unit 101 and a second material roll detection unit 102 (above all FIGS. 8A-8D). The material roll detection units 101, 102 are disposed so as to be laterally mutually spaced apart. Said material roll detection units 101, 102 are disposed on the support member 92 so as to neighbour articulation points of the adjustment cylinder units 97, 100. The material roll detection units 101, 102 are oriented in such a manner that said material roll detection units 101, 102 are capable of detecting a material roll 11 to be transferred or to be gripped, respectively. Said material roll detection units 101, 102 are directed towards the front in relation to the industrial truck 25. Moreover, said material roll detection units 101, 102 are disposed so as to be mutually oblique. The material roll detection units 101, 102 are disposed so as to be tilted towards one another such that the detection ranges of said material roll detection units 101, 102 overlap or superimpose one another, respectively.

Each material roll detection unit 101, 102 in terms of signalling is connected to the industrial truck control unit 85.

A navigation sensor 103 for navigating the industrial truck 25 is disposed at the top of the cabin 80. The navigation sensor 103 in terms of signalling is connected to the industrial truck control unit 85.

The coupling device 88 supports an object detection device 104 which is directed towards the front in relation to the industrial truck 25. The object detection device 104 in terms of signalling is connected to the industrial truck control unit 85.

The lift mast 86 in terms of the inclination thereof is adjustable downwards about a horizontally running inclination axis 105. Said lift mast 86 is pivotable towards the front and the rear in relation to the cabin 80. The lift mast 86 is assigned an inclination sensor 106 which is capable of detecting the current inclination of the lift mast 86 and thus also the current inclination of the gripping device 87. The inclination sensor 106 is disposed on the frame 79. The inclination sensor 106 in terms of signalling is connected to the industrial truck control unit 85.

The hydraulic lifting device 81 comprises a hydraulic fluid pressure variation detection installation 107 which is disposed in a hydraulic line of the industrial truck 25 and is capable of detecting a pressure variation of the hydraulic fluid of the hydraulic lifting device 81 when a load changes (FIG. 9). The hydraulic fluid pressure variation detection installation 107 in terms of signalling is connected to the industrial truck control unit 85.

The industrial truck 25 furthermore has a plurality of safety laser scanning devices 108 which in terms of signalling are connected to the industrial truck control unit 85 and in the event of any detected danger are capable of immediately stopping the industrial truck 25. A first safety laser scanning device 108 is disposed on the rear of the frame 79 and is directed towards the rear in relation to the industrial truck 25. A second safety laser scanning device 108 is disposed at the bottom of the lift mast 86 and is directed towards the front in relation to the industrial truck 25. Moreover, third safety laser scanning devices 108 which are in each case directed laterally outwards are disposed on the frame 79. An industrial truck 25 equipped in such a manner is used in the delivery system 61 shown in FIG. 4, for example. Such a delivery system 61 can dispense with a safety light barrier 74. The safety laser scanning devices 108 in terms of signalling are connected to a central controller 123 which in terms of signalling is connected to an operator terminal 76.

Each drive axle 109 of the industrial truck 25 is assigned a drive axle safety encode 110 which is capable of supplying items of information pertaining to angles and rotating speeds of the drive, or of the respective drive axle 109, respectively. The drive axle safety encoders 25 in terms of signalling are connected to the industrial truck control unit 85. The industrial truck 25 is thus particularly readily manoeuvrable.

A steering axle 111 of the industrial truck 25 is assigned a steering axle safety encode 112 which is capable of supplying items of information pertaining to the position and the angle of the steering axle 111. The steering axle safety encoder 112 in terms of signalling is connected to the industrial truck control unit 85. The industrial truck 25 is thus particularly readily manoeuvrable.

The coupling device 88 is assigned a gripper arm angle encoder 113 which is capable of supplying items of information pertaining to the position and the angle of the gripper arm installations 93, 94. Each gripper arm angle encoder 113 in terms of signalling is connected to the industrial truck control unit 85. The gripping device 87 is thus able to be used and aligned in relation to the material roll 11 to be gripped in a particularly reliable manner.

The carrying installation 90 moreover supports an inclination sensor 114 which is capable of detecting an inclination of the gripping device 87 in relation to the lift mast 86. The inclination sensor 114 in terms of signalling is connected to the industrial truck control unit 85. The gripping device 87 is thus able to be used and aligned in relation to the material roll 11 to be gripped in a particularly reliable manner.

The carrying installation 90 furthermore supports an inclination sensor 115 for detecting an inclination of the gripping device 87 in relation to a vertical. The inclination sensor 115 in terms of signalling is connected to the industrial truck control unit 85. The gripping device 87 is thus able to be used and aligned in relation to the material roll 11 be gripped in a particularly reliable manner.

Each transfer system 29 in the respective transfer region 31 comprises a transport truck stress relief device 116 (FIG. 15) which comprises a rigid lifting member 117 which is repositionable in terms of height. When not in use, the lifting member 117 is flush with the neighbouring hard surface. Each lifting member 117 in terms of height is repositionable by means of a cushion assembly 118 which to this end is inflatable with a gas such as air by means of an actuator 119. Each lifting member 117 is able to be lifted, for example, by at least 1 cm, preferably at least 3 cm, preferably at least 5 cm. Said lifting member 117 is preferably able to be lifted by at most 20 cm, preferably at most 15 cm, preferably at most 10 cm. For lowering the lifting member 117, the gas by means of the associated actuator 119 can again be discharged in a controlled manner from the cushion assembly 118. A spindle or hydraulic system can be used instead of a cushion assembly 118, for example.

Each lifting member 117 is in the manner of a plate or a block, for example, and has a rectangular upper engagement face. Each engagement face has a first dimension which corresponds approximately to a transverse dimension of the at least one channel part 59. Said first dimension is smaller than the transverse dimension of an entire transport truck 32. A second dimension of the engagement face, perpendicular to the first dimension, corresponds to a longitudinal dimension of the at least one channel part 59, for example.

Each transfer system 29 moreover comprises two material roll orientation detection sensors 120 which are capable of detecting the orientation of a transferred material roll 11 in the respective transfer region 31, or neighbouring the latter, respectively. The material roll orientation detection sensors 120 are disposed laterally beside one another so as to be spaced apart, preferably at a common height level. Said material roll orientation detection sensors 120 in use detect axial end regions of the material roll 11. In particular, an oblique position of the material roll 11, above all in the horizontal, can thus be detected. Each material roll orientation detection sensor 120 in terms of signalling is connected to a computer unit 121 which in turn in terms of signalling is connected to the transport truck 32 in the respective transfer region 31, in order for said transport truck 32 if required to be aligned with said material roll 11.

Each transfer region 31 is protected by a protective fence 122 which extends along the material roll orientation detection sensors 120. The transfer is immediately stopped in the event of any danger being detected.

The operation of the complete plant will be described in more detail hereunder.

When the tractor/semi-trailer combination 62 by a driver has been moved to the nominal stopping position thereof, and a clearance for the unloading of the tractor/semi-trailer combination 62 upon the corresponding removal of the tarpaulin 68 has been performed by the driver or any other person by way of the operator terminal 76, an industrial truck 25 in a self-acting manner starts to unload the material rolls 11 from the loading space 69. The unloading of the tractor/semi-trailer combination 62 is preferably performed laterally from the outside. The industrial truck 25 is capable of operating in a driverless manner, or a completely automatic or automated manner, respectively (FIGS. 1 to 5). Said industrial truck 25 has been accordingly activated by way of the communications installation thereof.

The object detection device 104 of the industrial truck 25 is capable of detecting the tractor/semi-trailer combination 62. In particular, the object detection device 104 is capable of detecting the loading area 66, the material rolls 11, and the tarpaulin frame 67 as well as the tarpaulin 68 (if present).

The material roll detection units 101, 102 are capable of detecting different circumferential portions of the material roll 11 to be gripped. The detected circumferential portions are situated at a common height level. The first detection range of the first material roll detection unit 101 is substantially larger than the second detection range of the second material roll detection unit 102. Said first detection range preferably covers a first circumferential portion of the material roll 11 enclosing an angular angle between 100° and 150°. The second detection range of the second material roll detection unit 102 preferably covers a second circumferential portion of the material roll 11 enclosing an angular angle between 10° and 50°. The second detection range lies completely within the first detection range.

The first material roll detection unit 101 is in particular capable of detecting the actual diameter of the material roll 11 be gripped. The second material roll detection unit 102 is in particular capable of detecting or reading an identification label or sticker which is disposed on the circumference of the material roll 11 and preferably includes a barcode, and serves for unequivocally identifying the material roll 11 to be gripped.

The first material roll detection unit 101, by way of the unequivocal identification of the material roll 11 by means of the second material roll detection unit 102, compares the actually detected diameter of the material roll 11 with a known diameter value from a database and/or with the diameter value stated on the identification label.

The inward goods safety installation 74 is active in the embodiment according to FIGS. 2, 3, 5. Alternatively or additionally, the safety laser scanning devices 108 are active (FIG. 5). Said safety laser scanning devices 108 are capable of immediately stopping the industrial truck 25 in the event of any danger identified.

For gripping a material roll 11 to be gripped, the first gripper arm installation 93 by way of the first bearing jaw 96 thereof is first brought to bear circumferentially with the material roll 11 to be gripped, the gripping device 87 being open herein. The first gripper arm installation 93 herein is in a predetermined position, the latter being a function of the diameter of the material roll 11 to be gripped. In the case of material rolls 11 having a large diameter (for example ≥150 cm), the first gripper arm installation 93 assumes an outer, or wide, respectively, position. In the case of material rolls 11 having a smaller diameter (for example <150 cm), the first gripper arm installation 93 assumes an inner, or tight, respectively, position. The first bearing jaw 96 in this instance bears circumferentially on the material roll 11 to be gripped. This takes place by displacing and steering the industrial truck 25 in a corresponding manner. The gripping device 87 has been moved to a corresponding height along the lift mast 86.

When the upstanding material roll 11 to be gripped then is situated in the gripping device 87, the second gripper arm installation 94, by means of activating the second adjustment cylinder unit 100, for actual gripping is pivoted in the direction of the fixed first gripper arm installation 93 such that the gripping device 87 is closed. The second gripper arm installation 94 by way of the second bearing jaw 99 thereof then comes to bear on the material roll 11 to be gripped, while the material roll receptacle space is reduced. The material roll 11 is held in a clamping manner by the gripping device 87. A bearing axis running through the bearing jaw is 96, 99 runs in the horizontal so as to be oblique to a longitudinal axis of the industrial truck 25. The gripper arm installations 93, 94 herein are preferably situated in one common, substantially horizontal, plane. The lift mast 86 is not inclined in relation to a vertical.

The actuating of the gripping device 87, of the displacement drive, and/or of the steering of the transfer assembly 25 is performed as a function of the respective diameter of the material roll 11 to be gripped. The diameter of the material roll 11 to be gripped can be determined, for example, by way of the first material roll detection sensor 101, or by means of the second material roll detection sensor 102 by way of the label/sticker disposed on said material roll 11. A theoretical nominal central axis of the material roll 11 to be gripped is derived as a function of the fixed, or preliminary, respectively, position of the first gripper arm installation 93 and the diameter of the material roll 11 to be gripped. The nominal central axis by means of the first and the second material roll detection unit 101, 102 is compared with the actual central axis of the real material roll 11 to be gripped. The central axis of the nominal position is displaced on account of the asymmetry of the gripping device 87 and of the asymmetry in the actuation of the gripper arm installation is 93, 94. The second gripper arm installation 94, the displacement drive, and/or the steering of the transfer assembly 25 are in particular activated in such a manner as a function of said values that said gripper arm installations 93, 94 securely grip the material roll 11 and engage on the material roll 11 substantially in mutually opposite circumferential regions of the material roll 11.

Figure 8C:
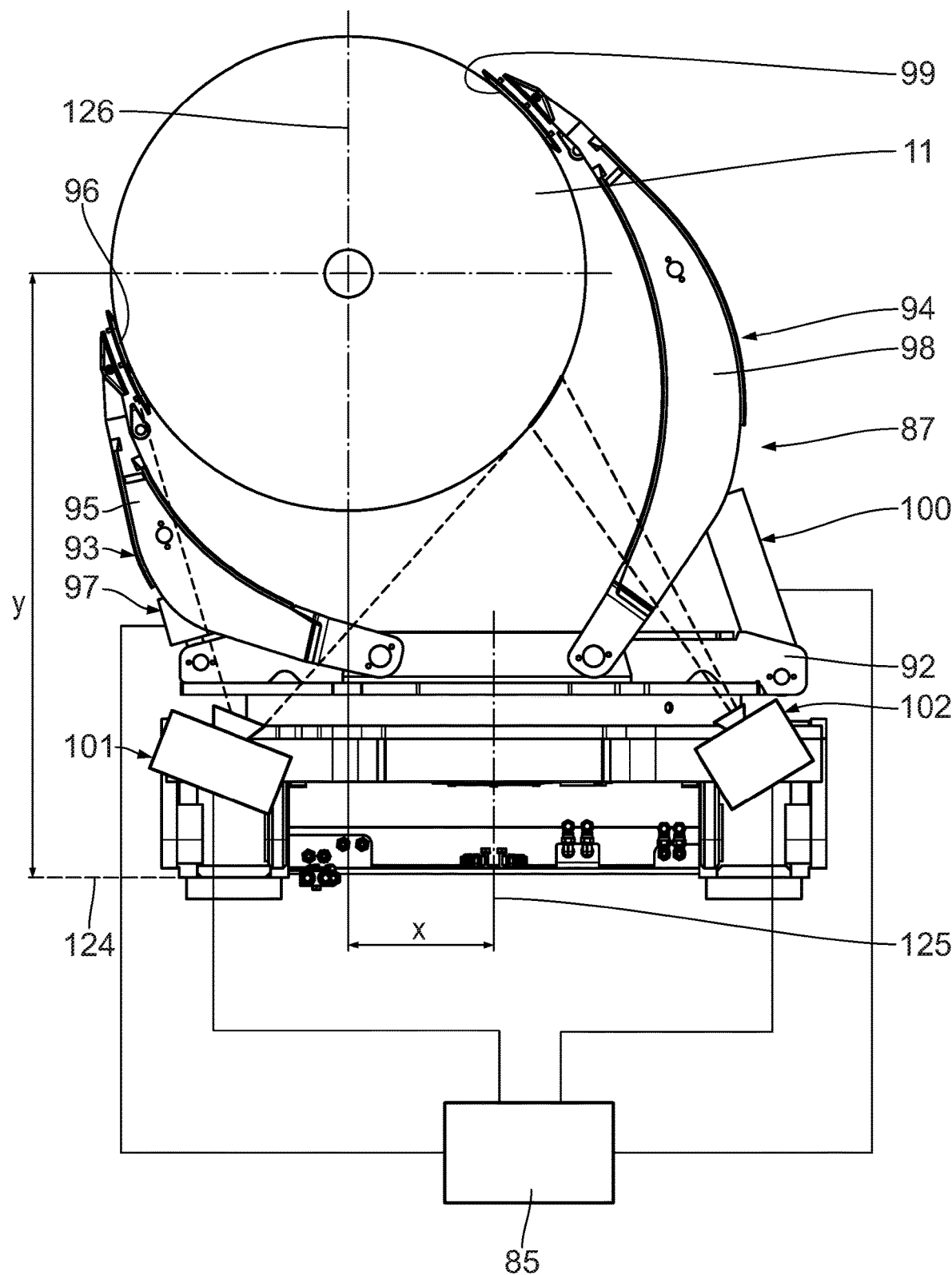
Figure 8D:
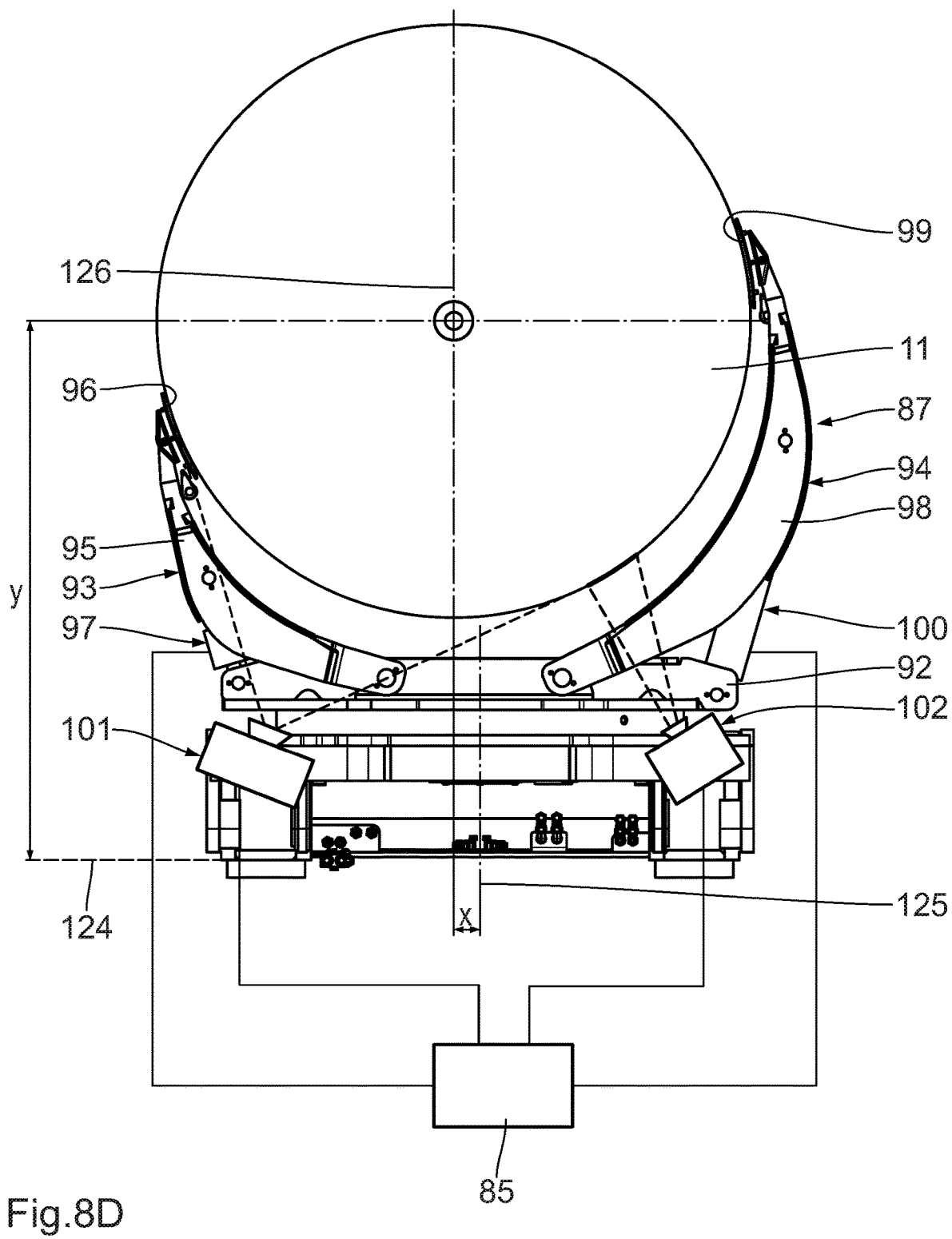

The central axis of the material roll 11 as a function of a diameter of the material roll 11 is displaced in relation to a reference point, or to the central plane 125 of the gripping device 87, respectively. The central axis of the material roll 11 herein is displaced on a curve or by a function, respectively, which is to be correspondingly taken into account when approaching the material roll 11. As is shown in FIG. 8C, the lateral horizontal offset between the central plane 125 of the gripping device 87 and the central plane 126 of the material roll 11 that encloses the central axis of the material roll 11 is comparatively large (value x) in the case of a gripped material roll 11 which has a small diameter. As is shown in FIG. 8D, the lateral horizontal offset between the central plane 125 of the gripping device 87 and the central plane 126 of the material roll 11 that encloses the central axis of the material roll 11 is comparatively small (value x) in the case of a gripped material roll 11 which has large diameter. The larger the diameter of the gripped material roll 11 the smaller the lateral horizontal offset between the central plane 125 of the gripping device 87 and the central plane 126 of the material roll 11 that encloses the central axis of the material roll 11. The first gripper arm 95 when gripping the material roll 11 has a substantially identical fixed, or preliminary, respectively, position or deflection, respectively. The smaller the diameter of the gripped material roll 11 the further the second gripper arm 98 is pivoted in the direction of the first gripper arm 95, or the central plane 125 of the gripping device 87, respectively. The smaller the diameter of the gripped material roll 11, the further away the gripped material roll 11 is held from the reference plane 124, or from the articulation points of the gripper arms 95, 98 on the support member 95.

The hydraulic fluid pressure variation detection installation 107 when lifting the material roll 11 detects a pressure variation in the hydraulic fluid of the hydraulic lifting device 81. The hydraulic fluid pressure variation detection installation 107 upon reaching a peak of an increase in a pressure of the hydraulic fluid detects a completely lifted state of the material roll 11. The material roll 11 is then completely lifted from the loading area 66. The hydraulic lifting device 81 then further lifts the material roll 11 by 20 mm so as to guarantee reliable unloading and optionally lifting across fittings, end features, tension belts, a loading sill, or the like of the tractor/semi-trailer combination 62, but prevent any damage to a roof of the tractor/semi-trailer combination 62. To this end, said hydraulic lifting device 81 has been correspondingly actuated by the industrial truck control unit 85.

For retrieving the material rolls 11, the industrial truck 25 reverses and herein moves away from the tractor/semi-trailer combination 62.

The industrial truck 25 then moves the gripped material roll 11 in a standing position to the material roll store 10. Said industrial truck 25 herein by way of the transfer assembly primary path 27 travels onto the transfer assembly circuit path 26 and then to the respective group 12. The industrial truck 25 sets down the material roll 11 in a standing position at the predetermined location. The object detection device 104 facilitates the setting down at the predetermined location. The gripping device 87 including the material roll 11 is lowered when setting down. The hydraulic fluid pressure variation detection installation 107 also detects when the material roll 11 has been set down. The material rolls 11 remain in the material roll store 10 until they are required.

A superordinate control initiates the pick-up of a material roll 11 to be used from the material roll store 10 for the corrugated cardboard production in the corrugated cardboard plant 1. Material rolls 11 required for the operation of the corrugated cardboard plant 1 are brought from the material roll store 10 by way of industrial trucks 25. Said required material rolls 11 are fed to the respective transfer system 29 by way of the transfer assembly primary path 27 and the transfer assembly circuit path 26 and the respective transfer assembly transverse path 28.

A transfer of the material roll 11 from the industrial truck 25 to a provided transport truck 32 takes place at the respective transfer region 31. On the one hand, the gripping device 87 herein is rotated from the previous position thereof by 90° such that the gripped material roll 11 assumes a lying, horizontal position. Furthermore, the carrying installation 90 is pivoted about the pivot axis 91. The gripping device 87 is then lowered and opened.

Before depositing the material roll 11 in the material roll receptacle 53, the cushion assembly 118 is inflated by way of the actuator 119, this leading to the lifting member 117 being lifted, or vertically repositioned, respectively. The lifting member 117 then engages from below on the at least one support plate 60, or the at least one channel part 59, respectively, on account of which the transport truck 32 is relieved of stress, and all of the wheel units 54 are lifted from the hard surface. The wheel units 54 are then situated in the air. An introduction of a load takes place directly into the lifted lifting member 117. The cushion assembly 118 is somewhat resilient so as to protect the rigid transport truck 25.

The material roll 11 disposed in the material roll receptacle 53 lies on the material roll detection sensor, the latter thus detecting a load by way of the material roll 11. Said material roll extends horizontally. The material roll 11 lies on the at least one channel part 59. The at least one channel part 59 by way of a circumferential sub-region of the material roll 11 bears on said material roll 11 from below or laterally.

The transport truck 32, upon lowering the lifting member 117 by the actuator 119, if required travels to the neighbouring material roll preparation assembly 147 where the incoming material roll 11 is received and prepared.

The prepared material roll 11, upon completion of the preparation, then travels by a/the transport truck 32 to a respective unwinding unit which requires said material roll 11. Alternatively, the bypass is utilized and the material roll preparation assembly 147 is circumvented.

The central control installation subsequently sends the loaded transport truck 32 to the splicing device 3, 4, 6, 7, 8 that requires the material roll 11.

The transport truck 32 by way of the respective path then travels to the splicing device 3, 4, 6, 7, 8.

Each industrial truck 25 can also be manually controlled. A plurality of industrial trucks 25 and transport trucks 32 are used in the complete plant. Switching between manual steering and automated steering, automated actuation of steering cylinders of the industrial truck 25, respectively, is favourably possible. A conversion to the manual operation preferably takes place in the case of critical or difficult, respectively, situations in the handling of the material roll 11 to be transferred.

Signalling connections can be embodied in a wireless or wire-bound manner, for example. Signals can be transmitted or relayed, respectively, by way of the signalling connections.

The complete plant can be operated in a completely automated manner, so to speak.

Figure 16:
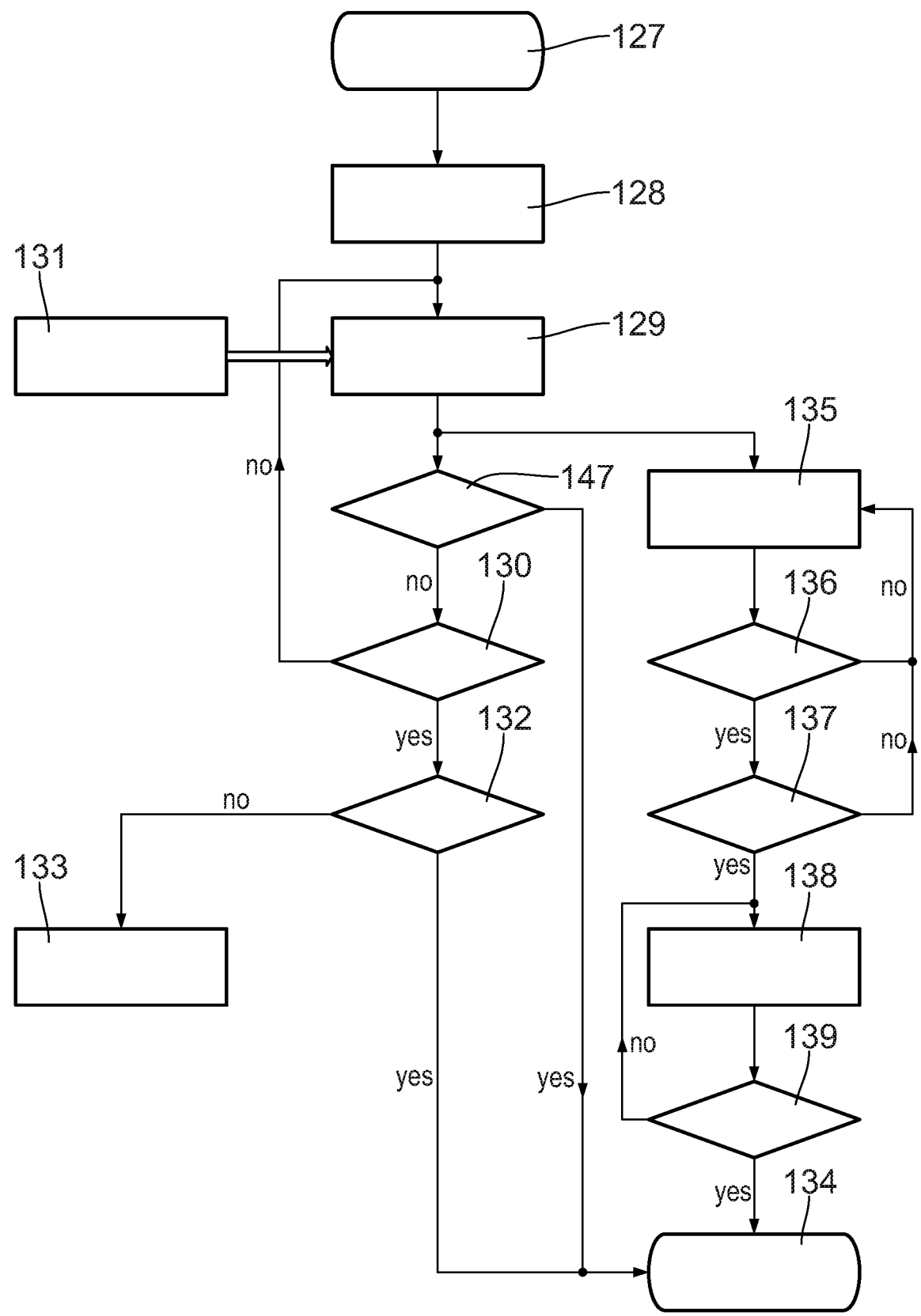
FIG. 16 shows a sequence diagram which visualizes a navigation of a transfer assembly illustrated in the figures.

A preferred navigation of an industrial truck 25 will be described in more detail with reference to FIG. 16.

In a first step 127, the industrial truck 25 to be navigated receives an itinerary from the superordinate controller.

In a next step 128, the industrial truck control unit 85 calculates, or determines, respectively, a suitable travel path for the industrial truck 25 in order for the itinerary to be carried out.

In a next step 129, the industrial truck control unit 85 of the industrial truck 25 optionally activates the displacement drive and/or the steering of the industrial truck 85, respectively, in relation to a deviation from an ideal line, or nominal line, respectively, or in order for said deviation be reduced, respectively.

According to a step 131, ranging by the navigation sensor 103 which is disposed on the industrial truck 25 and is preferably configured as a two-dimensional 360° lidar (light detection and ranging) sensor, and transferring of position data of the industrial truck 25 to a navigation computer which initially assumes controlling of the industrial truck 25 take place permanently or at all times, respectively. A basic navigation of the industrial truck 25 is thus implemented.

In a step 147 subsequent to step 129, a query pertaining to whether the nominal coordinates and the actual coordinates of the material roll 11 to be approached are identical takes place. This query corresponds to a query 137 as a result of the object detection device 104 of the industrial truck 25 and/or of the material roll detection device of said industrial truck 25, this query 137 being yet to be discussed hereunder.

Should the nominal coordinates and the actual coordinates of the material roll 11 to be approached not be identical, a query pertaining to whether the industrial truck 25 has reached the nominal position or target position, respectively, thereof by way of the stated basic navigation takes place in a next step 130.

Should the query according to step 130 result in the industrial truck 25 having reached the target position thereof by the stated basic navigation, a query pertaining to whether the material roll 11 to be approached has been identified or reached, respectively, takes place according to step 132. This check favourably takes place by way of the object detection device 104 of the industrial truck 25 and/or the material roll detection device of said industrial truck 25. Said check takes place permanently, or at all times, respectively, after receiving the itinerary according to step 127. The object detection device 104 and/or the material roll detection device upon receiving the itinerary searches permanently, or at all times, respectively, for material rolls 11 and for identified material rolls 11 transmits identification coordinates to the industrial truck control unit 85. The object detection device 104 is preferably embodied as a three-dimensional camera.

Should the query according to step 130 result in the industrial truck 25 not having reached the nominal position thereof by the stated basic navigation, a reset to step 129 takes place.

Should the query according to step 132 result in the material roll 11 to be approached not having been identified or reached, respectively, an error output takes place in a next step 133.

Should the query according to step 132 result in the material roll 11 to be approached having been identified or reached, respectively, a feedback according to which the "target" has been reached is emitted to the superordinate controller in step 134 as a response to step 132.

Should the query according to step 147 result in that the nominal coordinates and the actual coordinates of the material roll 11 to be approached are identical, this is directly followed by step 134.

According to a step 135, as a response to step 129, a search for the material roll 11 to be approached takes place by means of the object detection device 104 and/or the material roll detection device. As has been mentioned, such a search takes place permanently and at all times upon receiving the itinerary according to step 127.

In a step 136, a query pertaining to whether the material roll 11 to be approached has been identified by means of the object detection device 104 and/or the material roll detection device takes place.

Should the query according to step 136 result in that the material roll 11 to be approached has not been identified, a reset to step 135 takes place. The step 135 is repeated.

Should the query according to step 136 result in that the material roll 11 to be approached has been identified, a check pertaining to whether the nominal coordinates and the actual coordinates of the material roll 11 to be approached are identical takes place in a following step 137.

Should the check according to step 137 result in that the nominal coordinates and the actual coordinates of the material roll 11 to be approached are not identical, a reset to step 136 takes place. An incorrect material roll 11 has been targeted. The step 136 is repeated.

Should the check according to step 137 result in that the nominal coordinates and the actual coordinates of the material roll 11 to be approached are identical, a test of the controller by the object detection device 104 and/or the material roll detection device takes place in a next step 138. The correct material roll 11 has been approached.

In a next step 139, a query pertaining to whether the industrial truck 25 has reached the target position thereof takes place.

Should the query according to step 139 result in that the industrial truck 25 has not reached the target position thereof, a reset to step 138 takes place. The step 138 is repeated.

Should the query according to step 139 result in that the industrial truck 25 has reached the target position thereof, this is followed by step 134.

The navigation by way of the navigation sensor 103 controls the industrial truck 25 until a material roll 11 has been found in a matching position. Thereafter, the object detection device 104 and/or the material roll detection device takes over the displacement drive and/or the steering of the industrial truck 25 until the material roll 11 has been gripped (precision navigation) and successful receiving of the material roll 11 has been transmitted to the subordinate controller.

The described navigation of the industrial truck 25 is favourably used when unloading the material rolls 11 from the tractor/semi-trailer combination 62, when setting down the material rolls 11 in the material roll store 10, and/or when receiving the material rolls 11 in the material roll store 10. As has been mentioned, to this end the object detection device 104 and/or the material roll detection device thereof, and/or a further object detection device and/or the further material roll detection device thereof is/are favourably used. A further object detection device, or a further material roll detection device, respectively, is required in particular in the event of the view being obscured in the event of a gripped material roll 11.

The object detection device 104, or the material roll detection device thereof, respectively, detects free access for unloading the material rolls 11 and is capable of assuming and controlling a precise setting-down position in a final positioning of the material roll 11 (such as, for example, when detecting a loading sill on a tractor/semi-trailer combination).

The material rolls 11 can always be identified, and the position data of said material rolls 11 is permanently known, on account of the permanent ranging by way of the navigation sensor 103, this permitting a database to be permanently updated. The use of at least one three-dimensional camera in combination with ranging and navigating by means of at least two-dimensional lidar, and defining and identifying the material rolls 11 by way of the coordinates thereof, thus preferably takes place independently of an operating mode (automated/manual) of the industrial truck 25.

Each position of a material roll 11 is favourably assigned a marker position in the material roll store 10. In the event of an itinerary, the industrial truck 25 is communicated an approach direction as well as an item of information pertaining to height, this applying in particular when a plurality of material rolls 11 are disposed on top of one another in the material roll store 10.

A building reference point such as a shed reference point is favourably assigned for assigning coordinates.

It is expedient for precision navigation to take place, or to assume control of a movement of the transfer assembly 25, respectively, upon the unequivocal identification of the material roll to be transferred An identification of the material roll 10 to be transferred preferably takes place by way of coordinates (such as the volumetric centre of gravity, or the centre of the base area) and/or dimensions which conjointly with material data are managed in a database.

Figure 17:
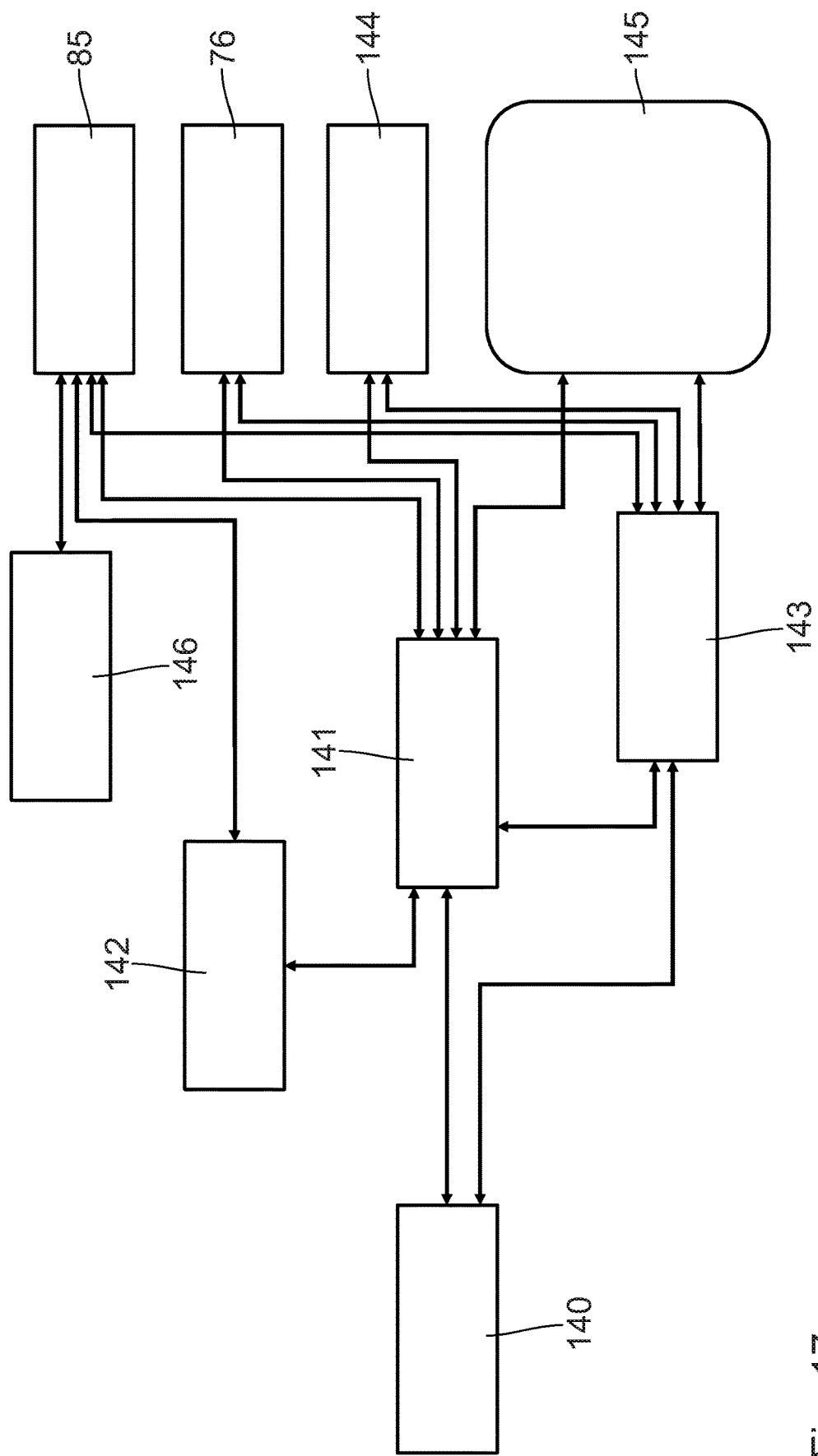
FIG. 17 shows a view which visualizes the controlling of the complete plant.

Preferred controlling of the complete plant is also visualized hereunder with reference to FIG. 17.

The corrugated cardboard plant 1 can be controlled by means of a corrugated cardboard plant controller 140. The corrugated cardboard plant controller 140 in terms of signalling is connected to a superordinate, or central, respectively, controller 141. Signals, or items of information, respectively, can be transmitted in both directions.

The superordinate controller of 141 in turn in terms of signalling is in turn connected to a store management system 142 for managing the material roll store 10. Signals, or items of information, respectively, can be transmitted in both directions.

The superordinate controller 141 in turn in terms of signalling is in turn connected to a safety controller 143. Signals, or items of information, respectively, can be transmitted in both directions.

The superordinate controller 141 in terms of signalling is moreover connected to the industrial truck control units 85, the operator terminal 76, a controller 144 of the transfer system 29, and transport truck controllers 145 of the transport trucks 32. Signals, or items of information, respectively, can in each case be transmitted in both directions.

The industrial truck control units 85 in terms of signalling are moreover connected to an industrial truck ranging and navigation unit 146. Signals, or items of information, respectively, can be transmitted in both directions.

The industrial truck control units 85 in terms of signalling are moreover connected to the safety controller 143. Signals, or items of information, respectively, can be transmitted in both directions.

The operator terminal 76 in terms of signalling is moreover connected to the safety controller 143. Signals, or items of information, respectively, can be transmitted in both directions. The safety controller 143 in terms of signalling is in particular also connected to the inward goods, or unloading, respectively, safety installation 74.

The controller 144 of the transfer system 29 in terms of signalling is moreover connected to the safety controller 143. Signals, or items of information, respectively, can be transmitted in both directions.

The transport truck controllers 145 in terms of signalling are connected to the safety controller 143. Signals, or items of information, respectively, can be transmitted in both directions. The safety controller in terms of signalling is in particular also connected to the safety laser scanning devices 108.

The safety controller 143 in terms of signalling is moreover connected to the corrugated cardboard plant controller 140. Signals, or items of information, respectively, can be transmitted in both directions.

Figure 18:
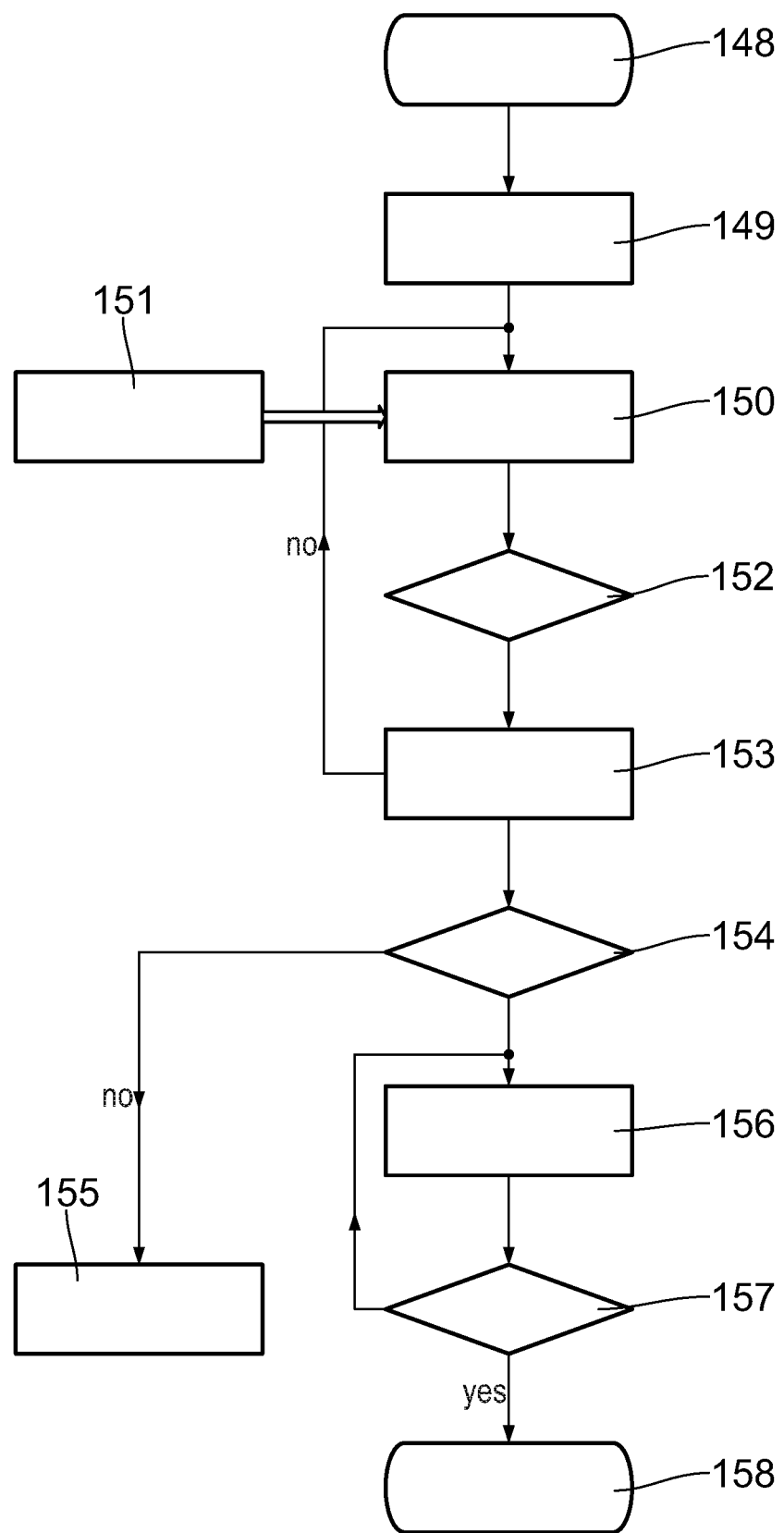
FIG. 18 shows a sequence diagram which visualizes an item of the goods being set down by means of the transfer assembly.

Preferred setting-down of a material roll 11 by means of an industrial truck 25 will be described in more detail hereunder with reference to FIG. 18.

In a first step 148, the industrial truck 25 to be navigated receives an itinerary from the superordinate controller.

In a next step 149, the industrial truck control unit 85 calculates, or determines, respectively, a suitable travel path for the industrial truck 25 in order for the itinerary to be carried out.

In a next step 150, the industrial truck control unit 85 of the industrial truck 25 optionally activates the displacement drive and/or the steering of the industrial truck 85 in relation to a deviation from an ideal line, or nominal line, respectively, or in order for said deviation to be reduced, respectively.

According to a step 151, ranging by the navigation sensor 103 which is disposed on the industrial truck 25 and is preferably configured as a two-dimensional 360° lidar (light detection and ranging) sensor, and transferring of position data of the industrial truck 25 to a navigation computer which initially assumes controlling of the industrial truck 25 take place permanently or at all times, respectively. A basic navigation of the industrial truck 25 is thus implemented.

In a next step 152, a query pertaining to whether the industrial truck 25 has reached the nominal position, or target position, respectively, thereof by the stated basic navigation takes place.

Should the query according to step 152 result in that the industrial truck 25 has not reached the nominal position thereof by the stated basic navigation, a reset to step 150 takes place.

Should the query according to step 152 result in that the industrial truck 25 has reached the nominal position thereof by the stated basic navigation, an evaluation of the setting-down point, or setting-down space, respectively, takes place by means of the object detection device 104 and/or the material roll detection device in a step 153.

In a next step 154, it is evaluated whether the setting-down point is freely accessible.

Should the evaluation result in that the setting-down point is not freely accessible, an error output takes place in a step 155. A manual operation of the industrial truck 25 is required in this instance.

Should the evaluation result in that the setting-down point is freely accessible, controlling of the industrial truck 25, or controlling of said industrial truck 25 by the object detection device 104 and/or the material roll detection device, respectively, while taking into account a setting-down height of the material roll 11 takes place in a next step 156. A precision navigation of the industrial truck 25 is thus implemented.

A check pertaining to whether the material roll 11 has been set down takes place in a next step 157. Should the material roll 11 have been set down, a feedback to the effect that the "target" has been reached to the superordinate controller that takes place in a next step 158.

The stated combination of basic navigation and precision navigation with the goods identification by way of the position coordinates of the gripped material roll 11 independently of an operating mode of the industrial truck 25 is particularly advantageous.

According to one alternative embodiment, corrugated cardboard which in terms of the number of plies thereof differs from the described corrugated cardboard is produced. The corrugated cardboard plant 1 used to this end is correspondingly modified.

Individual aspects, or subject matter, respectively, may be part of an independent invention.

What is claimed is:

1. A delivery system, comprising:
 a delivery vehicle for delivering inward goods;
 an automated transfer assembly for transferring the goods in an automated manner from the delivery vehicle to a goods store, wherein the transfer assembly comprises an object detection device, the transfer assembly comprising a first navigation installation and a second navigation installation which differs from the first navigation installation, the first navigation installation being active when displacing the transfer assembly, the second navigation installation being active upon the identification of an item of the goods to be gripped, the first navigation installation utilizing a navigation sensor, the second navigation installation utilizing a goods identification device, the goods identification device comprising a first sensor and a second sensor, the first sensor having a first sensor detecting range, the second sensor having a second sensor detecting range, the first sensor detecting range overlapping the second sensor detecting range to provide data for identifying at least one of the goods; and
 a safety installation for securing a movement range of the transfer assembly when unloading the goods.

2. The delivery system according to claim 1, wherein the delivery vehicle is designed for delivering material rolls.

3. The delivery system according to claim 1, wherein the delivery vehicle is a commercial vehicle.

4. The delivery system according to claim 1, wherein the transfer assembly comprises a gripping device for gripping the goods to be transferred.

5. The delivery system according to claim 4, wherein the gripping device comprises a first gripper arm installation for engaging on an item of the goods to be transferred, and a second gripper arm installation for engaging on the item of the goods to be gripped spaced apart from the first gripper arm installation, wherein the second gripper arm installation is longer in comparison to the first gripper arm installation.

6. The delivery system according to claim 1, wherein the transfer assembly comprises a lifting device for lifting an item of the goods to the transferred.

7. The delivery system according to claim 6, wherein the lifting device is embodied as a hydraulic lifting device and comprises a hydraulic fluid pressure variation detection installation for detecting a pressure variation of hydraulic fluid of the hydraulic lifting device.

8. The delivery system according to claim 7, wherein the hydraulic pressure variation detection installation upon reaching a peak of an increase in pressure of the hydraulic fluid of the hydraulic lifting device, detects a completely raised state of an item of the goods to be transferred.

9. The delivery system according to claim 8, wherein the lifting device, upon detecting the completely raised state of an item of the goods to be transferred, lifts the goods further by at least 10 mm.

10. The delivery system according to claim 8, wherein the lifting device, upon detecting the completely raised state of the item of the goods to be transferred, lifts an item of the goods further by at most 50 mm.

11. The delivery system according to claim 1, further comprising a stop marker for predefining a nominal stopping position for the delivery vehicle.

12. The delivery system according to claim 1, wherein the object detection device is capable of detecting the delivery vehicle.

13. The delivery system according to claim 12, wherein the object detection device is capable of detecting at least one of a loading area, a contour, and a superstructure of said delivery vehicle.

14. The delivery system according to claim 1, wherein the object detection device is capable of detecting an item of the goods to be transferred.

15. The delivery system according to claim 14, wherein the object detection device is capable of detecting at least one of a position and a transverse dimension of at least one of the item of the goods to be transferred and neighboring goods.

16. The delivery system according to claim 1, wherein the object detection device is capable of detecting obstacles.

17. The delivery system according to claim 1, wherein the safety installation is disposed on the transfer assembly.

18. The delivery system according to claim 17, further comprising a releasing installation for releasing a movement range of the transfer assembly for the unloading of the goods.

19. The delivery system according to claim 1, wherein the second navigation installation has a position accuracy that is greater than that of the first navigation installation.

20. The delivery system according to claim 1, wherein the first navigation installation is constantly active when displacing the transfer assembly.

21. The delivery system according to claim 1, wherein the first navigation installation is active when displacing the transfer assembly up to the identification of an item of the goods to be gripped.

22. The delivery system according to claim 1, wherein the first navigation installation comprises at least one two-dimensional lidar system.

23. The delivery system according to claim 1, wherein the second navigation installation is embodied as a three-dimensional goods identification system.

24. The delivery system according to claim 1, wherein the goods are capable of being identified by way of position coordinates of said goods.

25. A method for delivering inward goods, the method comprising the steps:
 providing at least one delivery system comprising:
  a delivery vehicle for delivering inward goods;
  an automated transfer assembly for transferring the goods in an automated manner from the delivery vehicle to a goods store, wherein the transfer assembly comprises an object detection device, the transfer assembly comprising a first navigation installation and a second navigation installation which differs from the first navigation installation, the first navigation installation being active when displacing the transfer assembly, the second navigation installation being active upon the identification of an item of the goods to be gripped, the first navigation installation utilizing a navigation sensor, the second navigation installation utilizing a goods identification device, wherein the transfer assembly comprises a gripping device for gripping the goods to be transferred, the gripping device comprising a support member, a first gripper arm installation and a second gripper arm installation, the first gripper arm installation and the second gripper arm installation being movably connected to the support member such that the first gripper arm installation and the second gripper arm installation are movable relative to the support member, the goods identification device comprising a goods identification device sensor mounted to the support member, wherein the goods identification device comprises another goods identification device sensor mounted to the support member, the another goods identification device sensor facing in a first direction, the goods identification device sensor facing in a second direction, the first direction being different from the second direction, the goods identification device comprising a first goods detection unit and a second goods detection unit, the first goods detection unit and the second goods detection unit being configured to detect different circumferential portions of the good to be gripped, wherein a first detection range of the first goods detection unit is greater than a second detection range of the second goods detection unit, wherein the second detection range lies completely within the first detection range; and a safety installation for securing a movement range of the transfer assembly when unloading the goods;

delivering the inward goods by means of the delivery vehicle;

transferring the goods in an automated manner from the delivery vehicle to the goods store by way of the automated transfer assembly; and securing the movement range of the transfer assembly by means of the safety installation when unloading the goods.

26. The delivery system according to claim 1, wherein the transfer assembly comprises a gripping device for gripping the goods to be transferred, the gripping device comprising a support member, a first gripper arm installation and a second gripper arm installation, the first gripper arm installation and the second gripper arm installation being movably connected to the support member such that the first gripper arm installation and the second gripper arm installation are movable relative to the support member, the goods identification device comprising a goods identification device sensor mounted to the support member.

27. The delivery system according to claim 26, wherein the goods identification device comprises another goods identification device sensor mounted to the support member, the another goods identification device sensor facing in a first direction, the goods identification device sensor facing in a second direction, the first direction being different from the second direction.

28. A delivery system, comprising:

a delivery vehicle for delivering inward goods;

an automated transfer assembly for transferring the goods in an automated manner from the delivery vehicle to a goods store, wherein the transfer assembly comprises an object detection device, the transfer assembly comprising a first navigation installation and a second navigation installation which differs from the first navigation installation, the first navigation installation being active when displacing the transfer assembly, the second navigation installation being active upon the identification of an item of the goods to be gripped, the first navigation installation utilizing a navigation sensor, the second navigation installation utilizing a goods identification device, the goods identification device being configured to detect a dimension of at least a portion of at least one of the goods and to identify the at least one of the goods based on at least a comparison of the detected dimension and a predetermined goods dimension, the goods identification device comprising a first goods detection unit and a second goods detection unit, the first goods detection unit and the second goods detection unit being configured to detect different circumferential portions of the good to be gripped, wherein a first detection range of the first goods detection unit is greater than a second detection range of the second goods detection unit, wherein the second detection range lies completely within the first detection range; and a safety installation for securing a movement range of the transfer assembly when unloading the good.

29. The method according to claim 25, wherein the inward goods are delivering material rolls.

* * * * *